US006574709B1

(12) United States Patent
Skazinski et al.

(10) Patent No.: US 6,574,709 B1
(45) Date of Patent: Jun. 3, 2003

(54) SYSTEM, APPARATUS, AND METHOD PROVIDING CACHE DATA MIRRORING TO A DATA STORAGE SYSTEM

(75) Inventors: Joseph G. Skazinski, Bertoud, CO (US); Noel S. Otterness, Boulder, CO (US)

(73) Assignee: International Business Machine Corporation, Armonk, NY (US)

(*) Notice: Subject to any disclaimer, the term of this patent is extended or adjusted under 35 U.S.C. 154(b) by 0 days.

(21) Appl. No.: 09/410,168

(22) Filed: Sep. 30, 1999

(51) Int. Cl.[7] .............................................. G06F 11/00
(52) U.S. Cl. ...................... 711/119; 711/144; 711/145; 711/156; 711/162
(58) Field of Search ................................ 711/119, 120, 711/129, 161, 162, 170, 173, 144, 145, 156, 159

(56) References Cited

U.S. PATENT DOCUMENTS

| | | | | |
|---|---|---|---|---|
| 5,588,110 A | * | 12/1996 | DeKoning et al. | 395/182.03 |
| 5,732,238 A | * | 3/1998 | Sarkozy | 711/135 |
| 5,761,705 A | * | 6/1998 | DeKoning et al. | 711/113 |
| 5,784,548 A | * | 7/1998 | Liong et al. | 714/6 |
| 5,802,561 A | * | 9/1998 | Fava et al. | 711/120 |
| 5,916,314 A | * | 6/1999 | Berg et al. | 714/6 |
| 5,974,506 A | * | 10/1999 | Sicola et al. | 711/120 |
| 6,009,481 A | * | 12/1999 | Mayer | 710/33 |
| 6,012,119 A | * | 1/2000 | Ninomiya et al. | 710/128 |
| 6,085,333 A | * | 7/2000 | DeKoning et al. | 714/7 |
| 6,202,115 B1 | * | 3/2001 | Khosrowpour | 710/129 |
| 6,247,099 B1 | * | 6/2001 | Skazinski et al. | 711/141 |

OTHER PUBLICATIONS

Massiglia, Paul, "The RAID Book, 6th Edition, A Storage System Technology Handbook," pp i–v and 216–229, Feb. 1997.*

* cited by examiner

Primary Examiner—Matthew Kim
Assistant Examiner—Stephen Elmore
(74) Attorney, Agent, or Firm—Dorsey & Whitney LLP

(57) ABSTRACT

The invention provides a system structure, method and computer program product for mirroring cache data from a first controller to an alternate controller in a data storage system, where the data storage system is being managed by the controllers in dual active configuration and the first and alternate controllers are also connected to a system drive that includes one or more disk storage devices and the first controller is connected to a first memory, and the alternate controller is connected to a second memory where each controller has an identical memory layout, and a cache line descriptor data structure defined therein and the cache line descriptor data structure is used by each respective controller to track data mirrored by the controller to a memory connected to an alternate controller and the cache line descriptor data structure includes information for reducing the amount of data mirrored to an alternate controller for secondary cache data mirror operations on same originating cache data with respect to a particular cache line and additionally, the cache line descriptor data structure includes information for coalescing multiple cache data mirror operations corresponding to a particular cache line into a single cache mirror operation to the alternate controller.

34 Claims, 10 Drawing Sheets

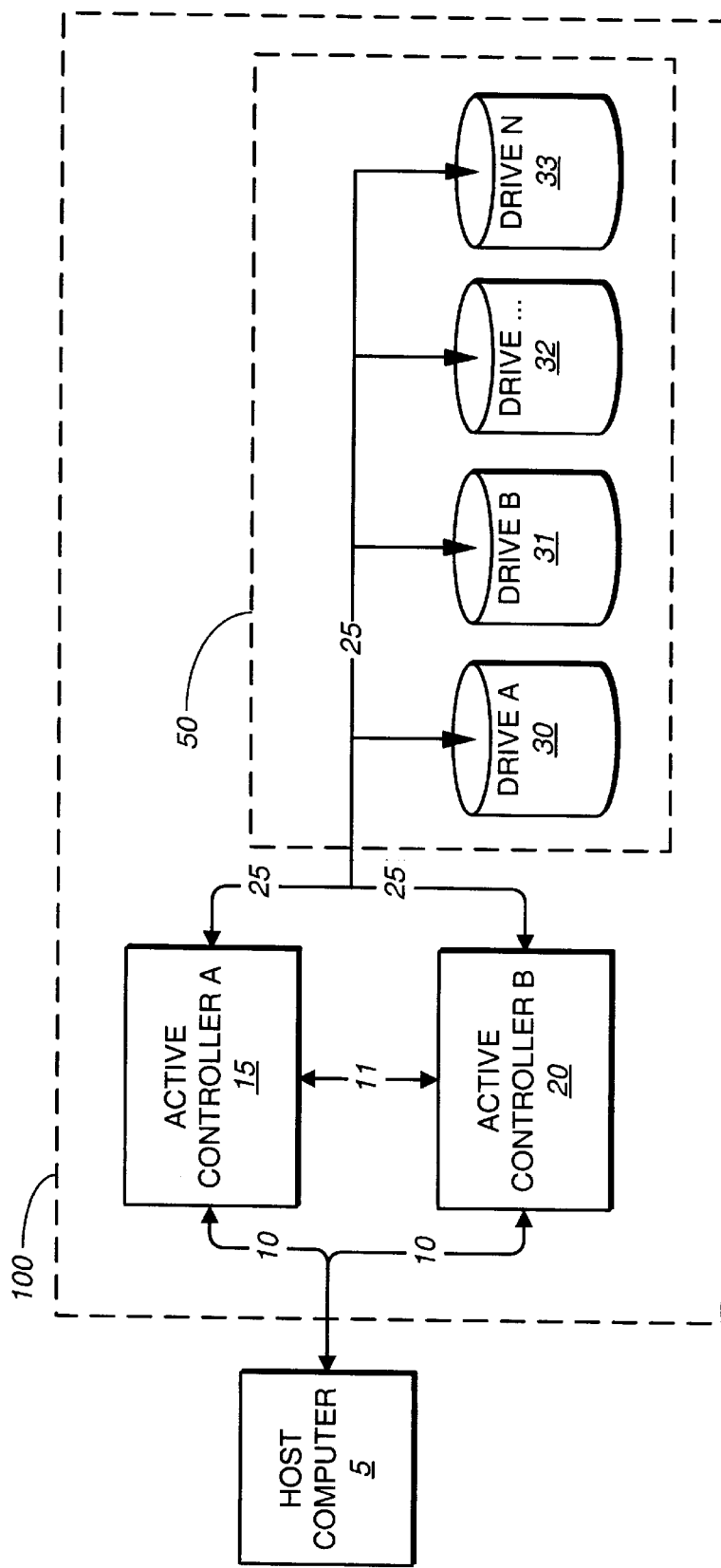
FIG._1 (PRIOR ART)

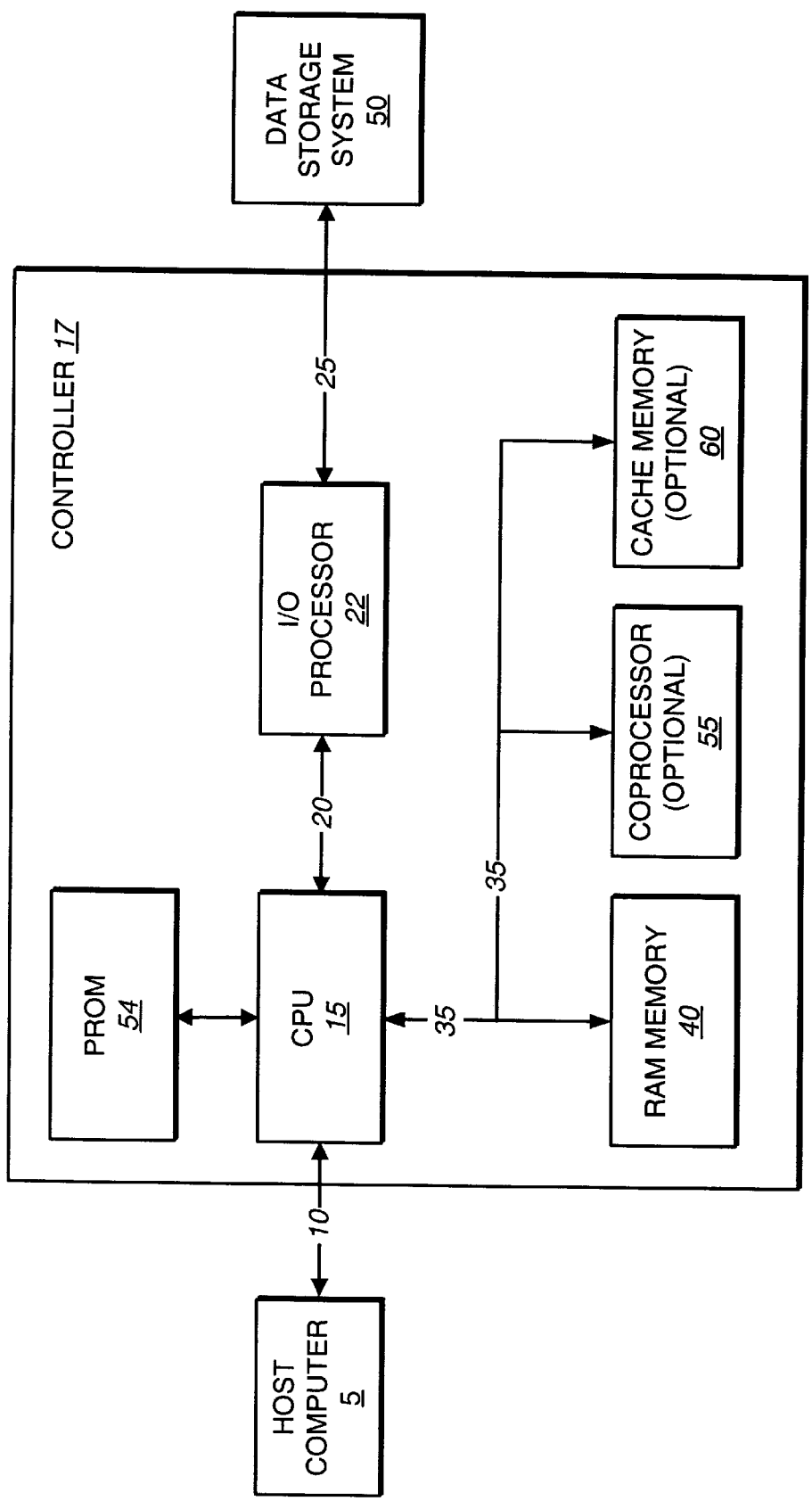
FIG._2

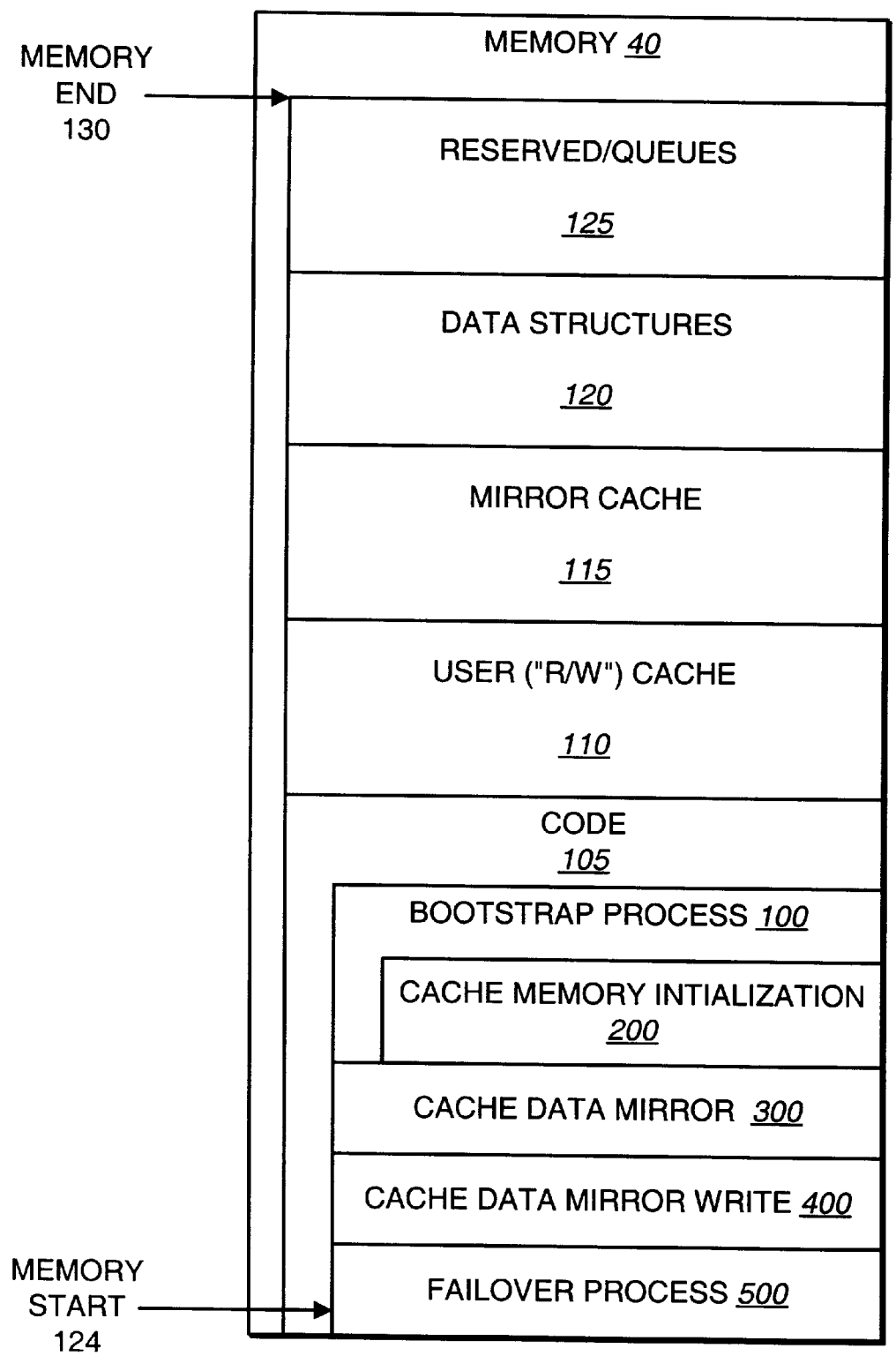
FIG._3

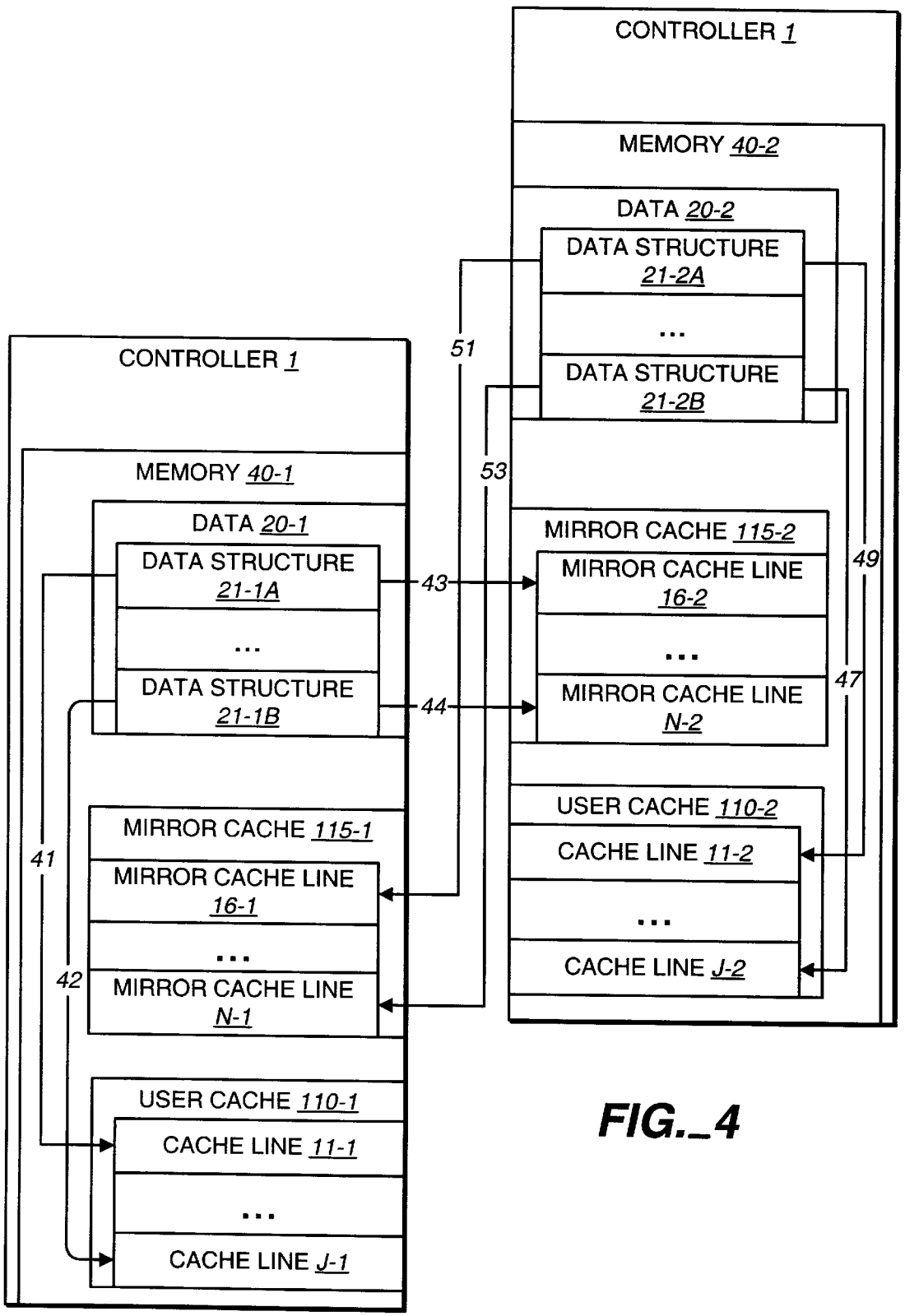
FIG._4

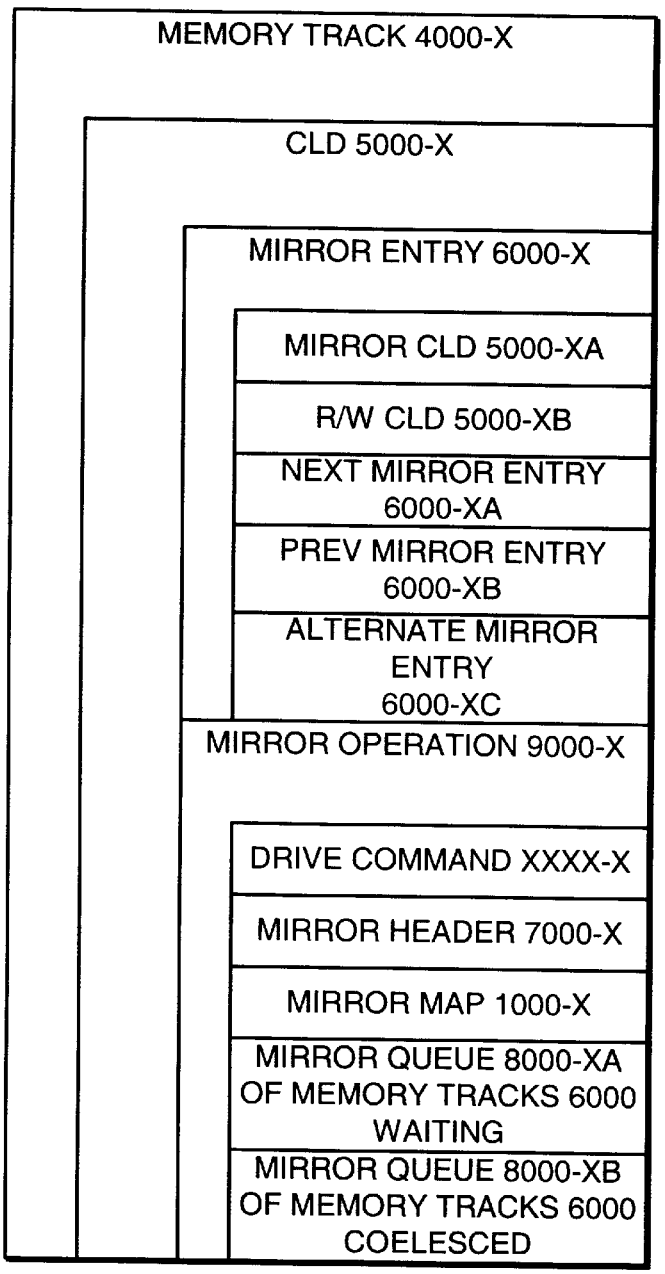
FIG._5
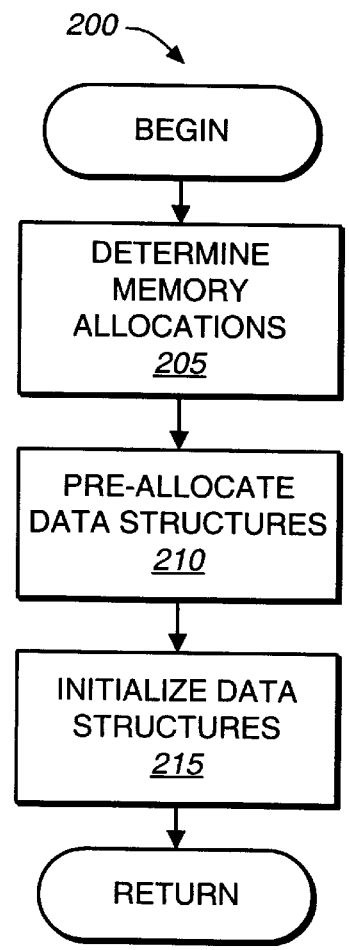
FIG._6

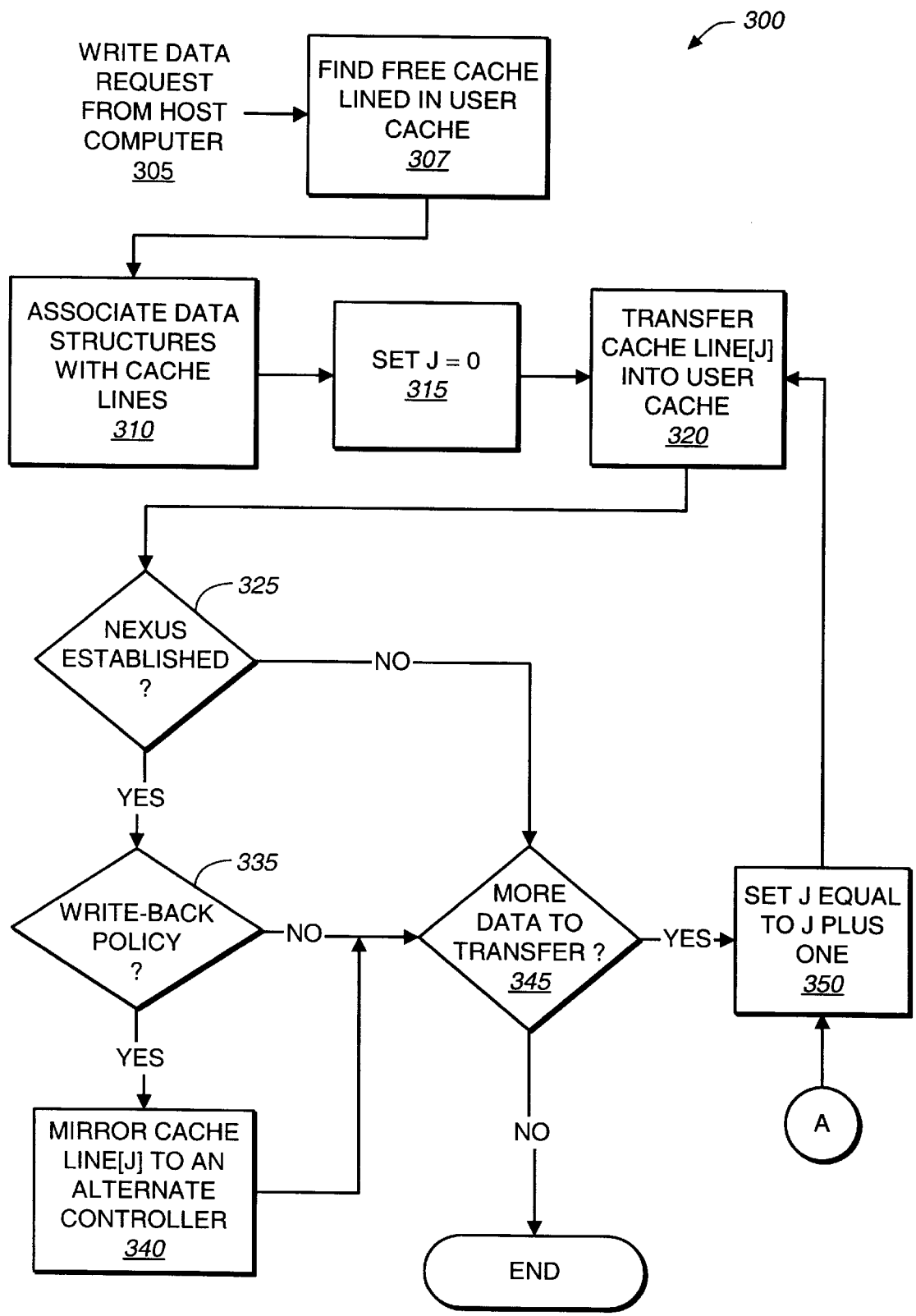
FIG._7

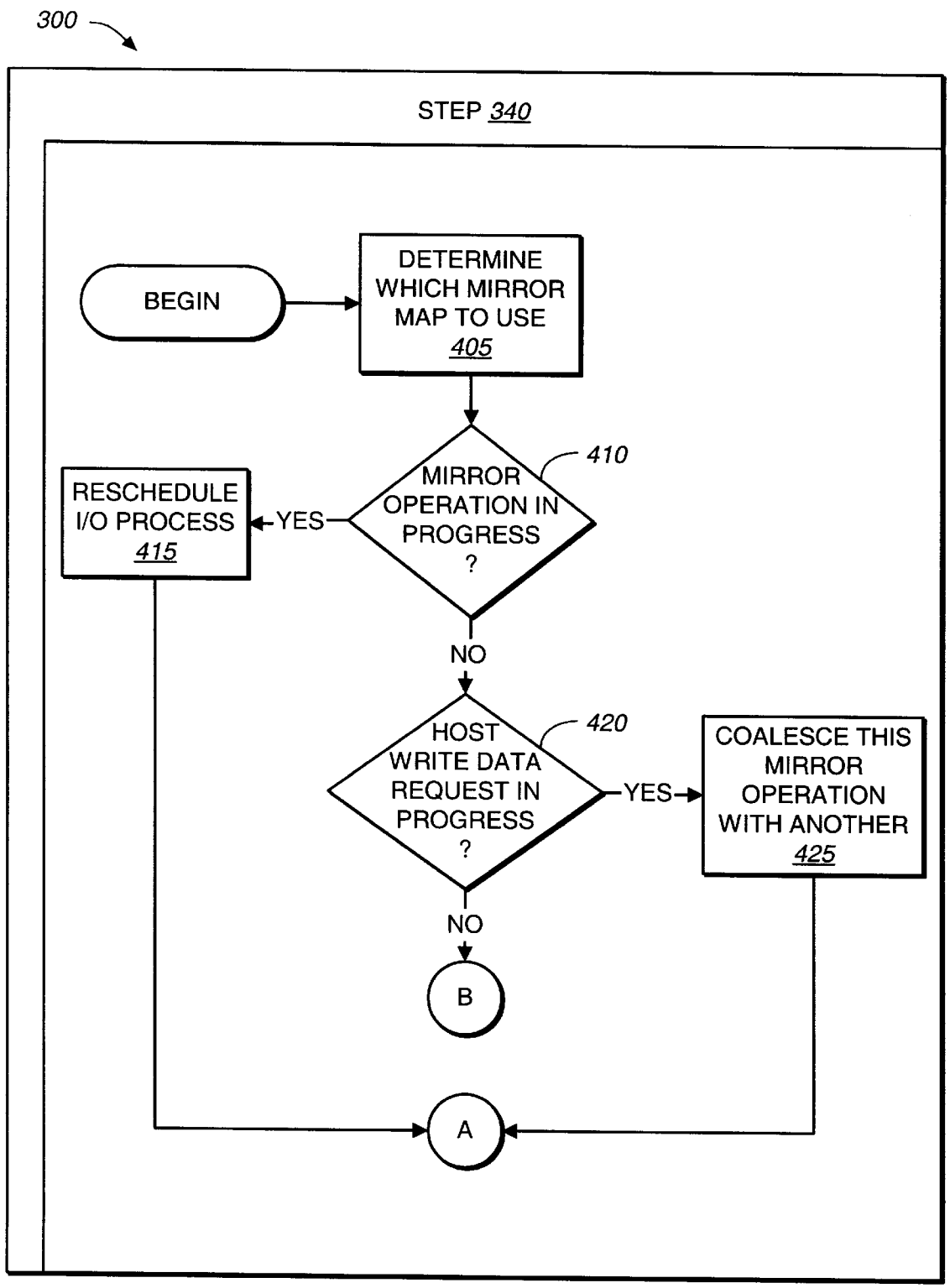
FIG._8

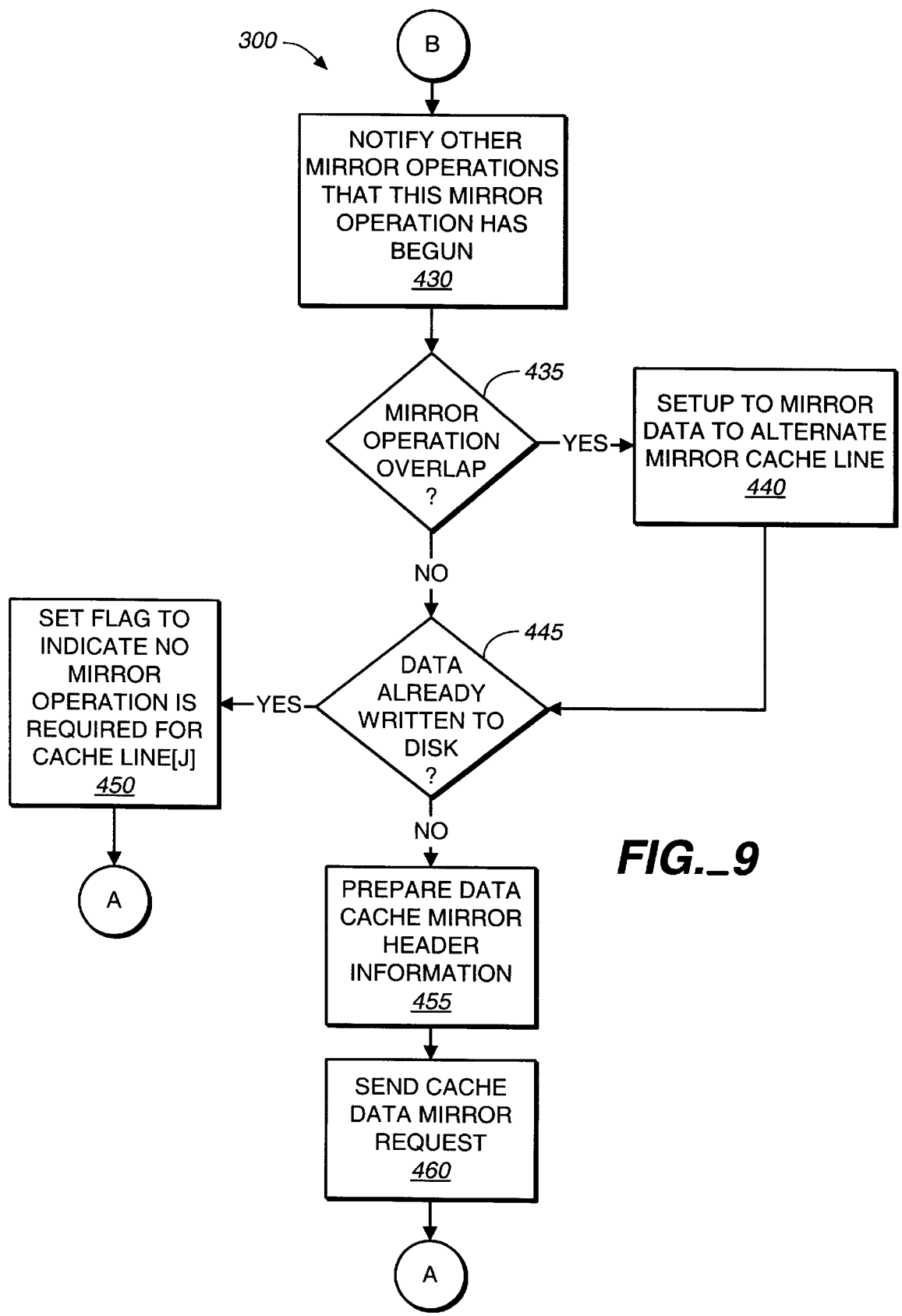
FIG._9

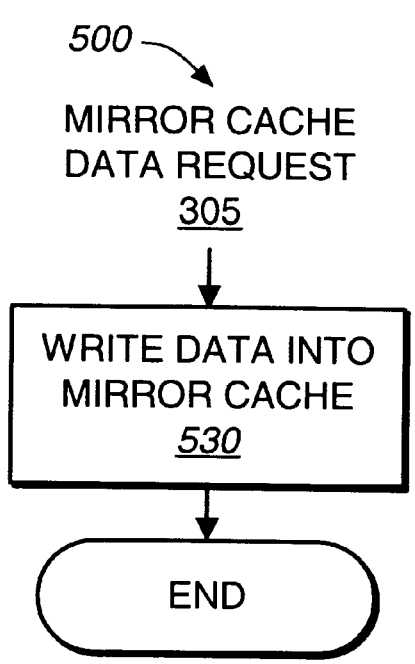
FIG._10
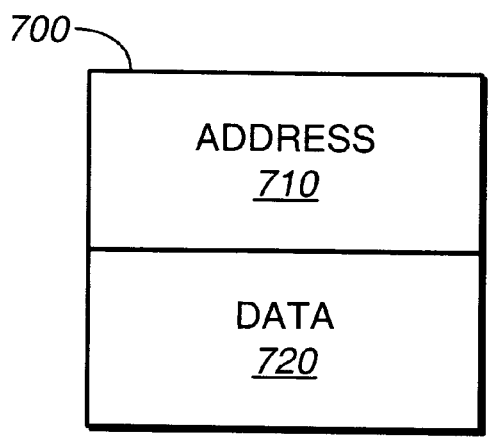
FIG._13
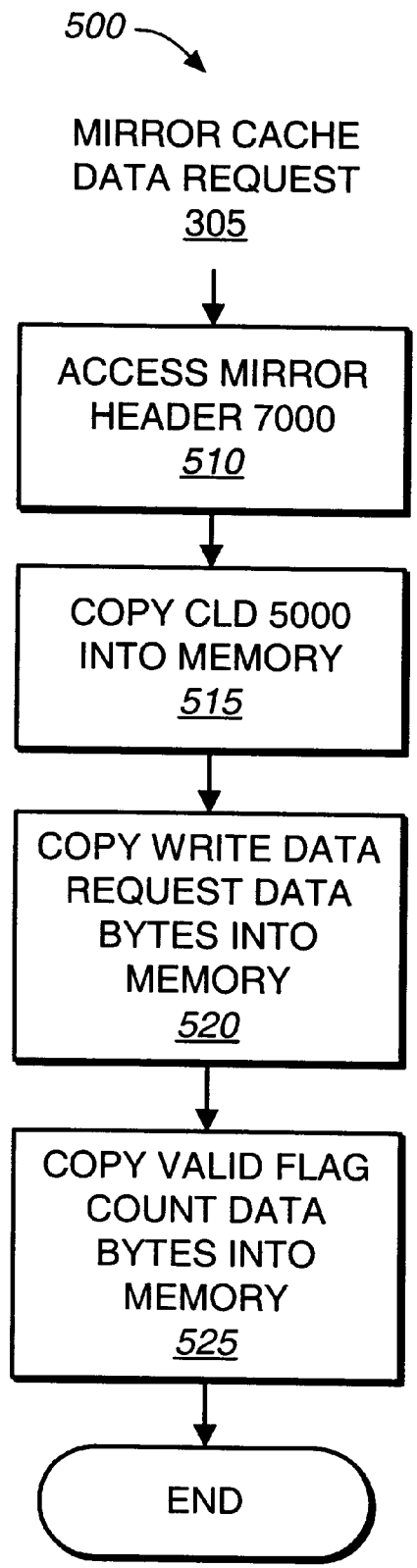
FIG._11

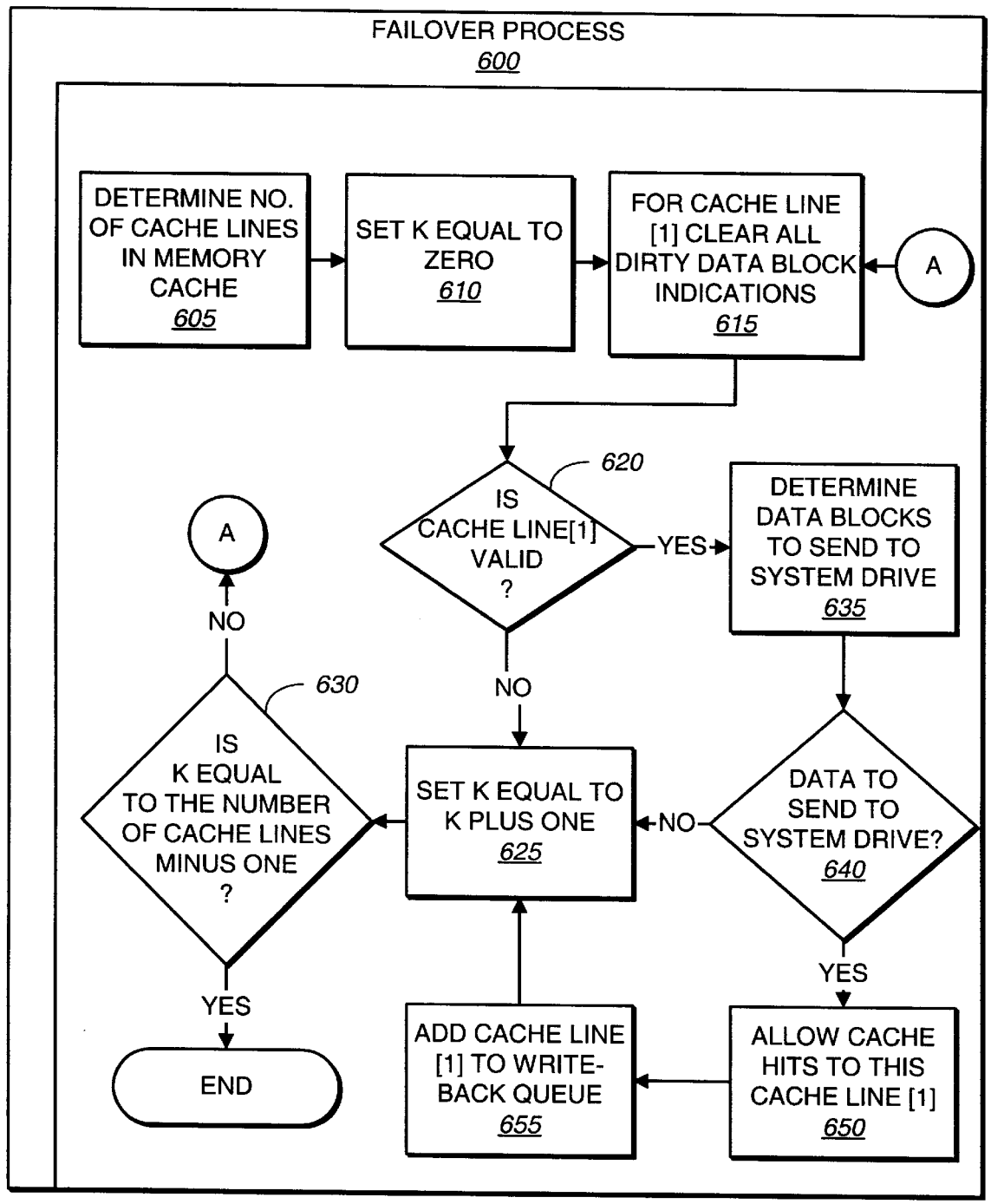
FIG._12

US 6,574,709 B1

SYSTEM, APPARATUS, AND METHOD PROVIDING CACHE DATA MIRRORING TO A DATA STORAGE SYSTEM

1.0 FIELD OF THE INVENTION

This invention relates generally to input/output processing structure and method for computer systems having a plurality of processing resources. More particularly, the present invention pertains to cache data mirroring by a controller to an alternate controller in a data storage system that is being managed, by the controllers, in dual active configuration.

2.0 BACKGROUND OF THE INVENTION

Modern computers, particularly computers operating in a server environment, require a large, fault-tolerant data storage system. Hard drives in all computer systems are susceptible to failures caused by temperature variations, head crashes, motor failure, controller failure, and changing voltage conditions. To improve reliability and protect the data in data storage systems, many data storage systems use a redundant array of independent disks (RAID) operated by a disk array controller. Conventional RAID systems typically consist of several individual disk controllers combined with a rack of drives to provide a fault-tolerant data storage system that is directly attached to a host computer. The host computer is then connected to a network of client computers to provide a large, fault-tolerant pool of storage accessible to all network clients. Typically, the disk array controller provides the brains of the data storage system, servicing all host requests, storing data to multiple drives, such as, for example, RAID drives, caching data for fast access, and handling any drive failures without interrupting host requests.

Caching data by a disk array controller into a cache memory increases the performance of data storage and retrieval operations by maintaining a collection of the most recent references made by a host computer. Cache memory can typically be operated in a write-back or write-through mode. In a write-back mode, write data is temporarily stored in the cache and written out to disk at a subsequent time. An advantage of this mode is that it increases the controller's performance. The RAID controller notifies a host computer that the write operation succeeded (by sending the host computer a completion status) although the write data has not been stored on the disk.

It is desirable for a data storage system to reliably function with any type of failed component, including a failed disk array controller. Failure of a single disk array controller in a data storage system having a single, or multiple independent controllers, renders the tasks that were being performed by the failed controller, and/or those tasks scheduled to be performed by the failed controller, inoperable.

Worse yet, the failure of a single disk array controller in a data storage system having only one controller, renders the entire RAID system inoperable. (Hereinafter, "disk array controller" is often referred to as "controller" to simplify the description, unless otherwise stated.) To circumvent the problem of a single point of failure that all single controller RAID systems exhibit and provide redundancy to a data storage system, dual active controllers were implemented.

A dual active controller configuration typically consists of a first controller and a second controller coupled to one another, so that in the event of a single controller failure, the surviving controller is able to take over the tasks that were being performed by the failed controller, and perform those tasks that were scheduled to be performed by the failed controller.

To take over the tasks of a failed controller, a surviving controller must keep track of both the tasks that its partner controller is working on, and the tasks that its partner controller is scheduled to work on before the failure occurs. To illustrate this, consider, for example, that a controller fails before data stored in its cache (in response to a write request from a host computer) is written onto a system drive. Data in the cache of a failed controller is lost unless a battery backup is used. In this situation, it is desirable for a surviving controller to complete the scheduled task of the failed controller by writing the data that was in the failed controller's cache onto the system drive.

To accomplish this, a surviving controller in active configuration would need to have a copy, or a mirror of the failed controller's cache. State-of-the-art data storage systems are limited because there are no known structure or procedures for copying or mirroring a controller's cache between other different controllers in active configuration. Therefore, what is needed, is a cache mirroring system, apparatus, and method for multi-controller environments.

3.0 BRIEF DESCRIPTION OF THE DRAWINGS

For a better understanding of the nature and objects of the invention, reference should be made to the following detailed description taken in conjunction with the accompanying drawings, in which:

FIG. 1 is a block diagram illustrating aspects of a data storage system being managed by two controllers in dual active configuration;

FIG. 2 is a block diagram illustrating aspects of a controller, according to one embodiment of the present invention;

FIG. 3 is a block diagram illustrating aspects of a controller's random access memory, according to one embodiment of the present invention;

FIG. 4 is a block diagram illustrating aspects of explicit linking of respective controller cache lines between two controllers, according to one embodiment of the present invention;

FIG. 5 is a block diagram illustrating aspects of data structure relationships, according to one embodiment of the present invention;

FIG. 6 is a flowchart illustrating aspects of a cache memory initialization procedure, according to one embodiment of the present invention;

FIG. 7 is a flowchart illustrating aspects of a cache data mirror procedure (CDMP), according to one embodiment of the present invention;

FIG. 8 is a flowchart illustrating aspects of a cache data mirror procedure (CDMP), according to one embodiment of the present invention;

FIG. 9 is a flowchart illustrating aspects of a cache data mirror procedure (CDMP), according to one embodiment of the present invention;

FIG. 10 is a flowchart illustrating aspects of a mirror write procedure, according to one embodiment of the present invention;

FIG. 11 is a flowchart illustrating aspects of yet another embodiment of a mirror write procedure;

FIG. 12 is a flowchart illustrating aspects of a failover procedure, according to one embodiment of the present invention; and, FIG. 13 is a block diagram illustrating aspects of a mirror cache data request, according to one embodiment of the present invention.

4.0 SUMMARY OF THE INVENTION

Heretofore, data storage system performance and fault tolerance have been limited because the state-of-the-art data does not provide a system, structure, or procedures for cache data mirroring across controllers in a data storage system that is being managed by the controllers in dual active configuration. This invention provides such a system, structure, and procedure.

In one aspect, the invention provides a method for mirroring cache data from a first controller to an alternate controller in a data storage system, where the data storage system includes a host computer connected to the first controller and the alternate controller. The first and alternate controllers are also connected to a system drive that includes one or more disk storage devices. The first controller is connected to a first memory, and the alternate controller is connected to a second memory. The first and alternate controllers manage the data storage system in dual active configuration.

According to this method, the first controller receives a write data request from the host computer, the write data request includes data to be written by the first controller to the system drive. The first controller caches the data into the first memory. Next, the first controller mirrors the data to the alternate controller, such that the alternate controller copies the data into the second memory.

In this method, the data in the first memory is explicitly linked to the data in the second memory. This is beneficial because, a controller performing a cache data mirror operation does not need to ask an alternate controller for a location, in the alternate controller's memory, to transfer the data into. Instead of having to perform a query and wait for a response, the location in the alternate controller's memory can be determined through the knowledge of what has already been used and what is available in the mirroring controller's memory.

According to this method, multiple cache data mirror operations to a particular cache line, are coalesced into a single cache data mirror operation. This is beneficial because, the number of cache mirroring operations needed to be performed by a controller may be reduced.

In yet another aspect, the invention provides a controller for connecting to at least one disk storage device, and for connecting to a host computer. The controller is connected to a memory that has a cache line descriptor data structure defined therein. The cache line descriptor data structure is used by the controller to track data mirrored by the controller to a memory connected to an alternate controller.

In this aspect, the cache line descriptor data structure includes information about which data blocks in a cache line have changed since a previous cache operation to the cache line. This is beneficial, because it reduces the amount of data being transferred from one controller to an alternate controller.

In yet another aspect, the invention provides a data storage system with cache data mirroring between a first and a second controller connected to a host computer and a system drive, where the system drive includes one or more disk storage devices. The first and second controllers each have an identical respective memory layout. The first controller is connected to a first memory, the second controller is connected to a second memory. Both the first and the second memories have a cache line descriptor data structure defined therein.

Using an identical memory layout scheme used across controllers is beneficial because, through the use of references in the cache line descriptor data structure, each cache line in a user cache memory in the first controller is explicitly linked to a respective cache line in a mirror cache memory located on the second controller.

5.0 DETAILED DESCRIPTION OF EMBODIMENTS OF THE INVENTION

The invention will now be described in detail by way of illustrations and examples for purposes of clarity and understanding. It will be readily apparent to those of ordinary skill in the art in light of the teachings of this invention that certain changes in modifications may be made thereto without departing from the spirit or scope of the appended claims. We first provide a top-level architectural description. Section headings are provided for convenience and are not be construed as limiting the disclosure, as all various aspects of the invention are described in the several sections were specifically labeled as such in a heading.

For purposes of simplifying the description, a process of caching data, by a controller, to an alternate, or partner controller is hereinafter, referred to as a "cache data mirror process." A controller that is performing a cache mirror process is referred to as a "mirroring controller." A controller that is receiving data that is being mirrored by another controller to the controller, is referred to as an "alternate controller."

5.1 TOP-LEVEL SYSTEM DESCRIPTION

To illustrate a dual active controller configuration according to the teachings of one embodiment, refer to FIG. 1, where there is shown a data storage system With controllers in dual active configuration 100. Host computer 5, for example, a general-purpose computer, is connected to controller 15 and controller 20 across host peripheral bus 10. Controller 15 and controller 20 may typically be embodied as separate plug-in adapter cards in host computer 5 (as is the case with many general-purpose computer systems). Alternatively, controller 15 and controller 20 may be integrated as respective controller chips on a motherboard of host computer 5, or respectively configured as separate external controller units.

Controller 15 and controller 20 are connected to one or more SCSI or Fibre Channel devices across SCSI or Fibre Channel bus 25. SCSI device types include, for example, disk drives, tape drives, printers, CD-ROM drives, scanners, optical disks, etc. Although the SCSI devices can be limited to a single type, such as disk drives, or also include SCSI devices of the types listed above, the SCSI devices include drive A 30, drive B 31, drive . . . 32, and drive N 33. In this example, for purposes of illustration and convenience there are shown only four drives, drive A 30, drive B 31, drive . . . 32, and drive N 33. However, as can be appreciated, the present invention is applicable to data storage systems 50 (see FIG. 1) with any number of data storage devices.

Controller 15 and controller 20 are connected by cable 11 or other communication link (such as fiber optic), for sending, by each respective controller, configuration information. Another method of communications is to allow the controllers 15 and 20 to communicate with each other through the SCSI/Fibre Channel bus 25. The latter technique may be used in the Mylex Family of external controllers such as the DACSX, DACFL, DACSF, or DACFF controllers.

Such configuration information includes, for example, each respective controller's cache information allowing a controller's respective partner controller to keep track of both the tasks that its respective partner controller is working on, and the tasks that its respective partner controller is scheduled to work on.

5.2 EXEMPLARY EMBODIMENT OF A CONTROLLER ARCHITECTURE

Referring to FIG. 2, there is shown a block diagram illustrating aspects of controller 17 according to an embodiment of the present invention. The controllers illustrated in FIG. 1 (controller A 15 and controller B 20) are similar in structure and function to controller 17.

Controller 17 includes a processor, typically a central processing unit, or "CPU" 15 connected to host peripheral bus 10, for performing basic system level procedures to manage a data storage system, and for executing application procedures stored in memory 40. Such application procedures are discussed in greater detail below. CPU 15 is also coupled to secondary peripheral bus 20 as are one or more I/O processors, for example, I/O processor 22. I/O processor 22 is coupled to physical interface 30, acting as an interface between secondary peripheral bus 20 and physical interface 25 which connects to other I/O devices which may be of any conventional type, for example, SCSI I/O devices of the type discussed in greater detail above in reference to FIG. 1. CPU 15 is also coupled to local bus 35 internal to controller 17, which in turn is coupled to memory 40. CPU 15 is connected to the optional co-processor 55 through local bus 35.

Coprocessor 55 is optional, and if present, coprocessor 55 is operatively coupled to on-board cache memory 60 which is used by coprocessor 55 as volatile storage to temporarily store data most recently read and written by a host computer, for example host computer 5 (see FIG. 1). If coprocessor 55 is not present, CPU 15 caches data received from a host computer into cache memory 60.

Coprocessor 55, if present, also performs error correction code encoding and decoding on data that is written to and read from the peripheral devices. Error correction code encoding and decoding are well-known procedures of verifying and maintaining data integrity, especially in magnetic disk drive devices, and are therefore, not described in further detail here.

In a preferred embodiment, controller 17 may be implemented using firmware customization (enhancements) to: (a) a DAC960 series of controllers, such as the RAID controller made by Mylex™ of Fremont, Calif. (b) CPU 15 is a 32-bit Intel i960 RISC microprocessor with multitasking functionality;. (c) PROM 54 is a predetermined amount of flash erasable/programmable read only memory (EPROM); (d) memory 40 is a user configurable amount of RAM where user configurable amounts equal from 8 MB of RAM to 256 MB of RAM that can be installed in increments of 8 MB; (e) second peripheral bus 20 is a secondary PCI bus; and (f) physical interface 25 is also a PCI bus.

Referring to FIG. 3, there is shown memory 40, according to one embodiment of the present invention. Memory 40 includes, for example: (a) code block 105, for storing executable procedures that perform the method of the present invention; (b) user, read/write ("R/W") cache 110, for storing data cached by a controller in response to host computer read and write data requests; (c) mirror cache 115, for storing data cached by a controller in response to a cache data mirroring operation by an alternate controller; (d) data 120, for storing, for example, by a controller, data structures that are allocated by the executable procedures such as a computer program, stored in code 5; and (e) reserved/queues 125 memory block, for storing, by a controller, for example, information for scheduling queues, and configuring disk drives with configurable default parameter settings. Such scheduling queues can include, for example, linked lists of I/O processes tracking the completion of write requests from a host computer.

I/O processes are known in the art and discussed only briefly here. An I/O process performs a series of steps to either store or retrieve information from one or more physical disk storage devices, such as the disk drives described above, that are addressable by a controller. An I/O process is typically created by a controller in response to sending a command request, received from a host computer, to one or more disk storage devices. An I/O process typically ends after command completion information has been returned to the host system by the controller, which typically occurs after a controller has received command completion information from each disk storage device in a system drive that is executing the command that the particular I/O process managing. However, according to one aspect of this invention, such command completion information is sent to a host computer after data corresponding to a write data request is mirrored to an alternate controller, and before the data is written by a controller to one or more disk storage devices in the system drive.

In a preferred embodiment of the present invention, memory 40 is allocated on each controller in a data storage system according to a predefined scheme where: (a) a first memory address is located at memory start 124, and a last memory address is located at memory end 130; and (b) each controller organizes the respective locations of code block 105, user cache 110, mirror cache 115, data structures 120, and reserved/queues 125, in a similar manner. To illustrate this, for example, the location of code 6, and reserved/queues 125 in memory 40 on a first controller, is the same as the location of code 105 in memory 40 on a second controller; the location of user cache 110 in memory 40 on a first controller, is the same as the location of user cache 110 in memory 40 on a second controller.

In a preferred embodiment, data structures 120 is organized into several memory blocks, including, for example:

- A mirror entry memory block (not shown), for storing, by a controller, pre-allocated data structures, for example, Mirror entry data structures (see Table 6), that contain "pointers" to other data structures that are used to maintain and track cache lines mirrored by an alternate controller to this controller. Mirror entry data structures are described in greater detail below in section 5.3.6. Such other data structures include, for example, cache line descriptor ("CLD") data structures (see Table 5), which are discussed in greater detail below in Section 5.3.5;
- A mirror cache line descriptor ("mirror CLD") memory block (not shown), for storing, by this controller, CLD data structures that were mirrored to this controller by an alternate controller. These mirror CLD data structures are advantageously used by this controller, in the event of the failure of the alternate controller to maintain and track tasks being performed or scheduled to be performed by the alternate controller. Mirror CLD data structures are discussed in greater detail below in Section 5.3.5, and Table 5; and
- A read/write ("R/W") CLD memory block, for storing, by this controller, CLD data structures that maintain and track cache lines in user cache 110. CLD data structures are described a greater detail below in Section 5.3.5.

It can be appreciated that other memory organization schemes could be used by the present invention. The important thing, as noted above, is to use an identical memory layout scheme across each respective controller in a data storage system.

5.3 DATA STRUCTURE ARCHITECTURE

To provide intelligent cache data mirroring to a data storage system, the present invention uses a set of data structures that provide, for example, the following types of information:

(a) information that tracks the status and location in an alternate controller's memory, for example, mirror cache 115 (see FIG. 3), of data mirrored, by a controller, to an alternate controller, such information includes, for example, an indication of which blocks of a cache line have not yet been written to a disk drive;

(b) information that tracks the status and location in a controller's memory, for example, user cache 110, of data that is being transferred by a host computer to a controller, such information includes, for example, the address in user cache 110 of where the data is cached, and a byte count of the cached data;

(c) information that facilitates writing into a controller's memory, for example, mirror cache 115 (see FIG. 3), by a controller, of data that is being mirrored to the controller by an alternate controller; such information includes, for example, byte count, where to write the data;

(d) information that keeps track of multiple write data requests from a host computer (or I/O processes) that are queued up by the present invention into a single cache data mirror operation, such information includes, for example, a linked list of I/O processes corresponding to respective write data requests from a host computer; and (e) information that organizes the execution, by controller, of a cache data mirror operation, such information includes, for example, an indication of how many cache data mirror operations are being handled (coalesced) into a single cache data mirror operation.

In one embodiment, the set of data structures are maintained by controller 17 in memory 40 (see FIG. 3). In yet another embodiment of the present invention, the below described data structures and structural elements are maintained by controller 17 in optional cache memory 60.

We now describe an exemplary set of data structures. It can be appreciated that although these exemplary data structures are illustrated with certain structural elements, other structural elements could be used as long as the purpose of each respective data structure is maintained. Additionally, even the data structures themselves could be replaced with more, or fewer data structures, as long as the high level procedures of the present invention are followed.

Each of the following data structures are described in pseudocode. The pseudocode used is, essentially, a computer language using universal computer language conventions. While the pseudocode employed here has been provided solely for the purposes of this description, it is readily understandable by any computer programmer having ordinary skill in the art.

Each of the below described data structures and structural elements are represented according to each respective structural element's desired data type, wherein: (a) "U32" represents an unsigned 32-bit integer; (b) "U8" represents an unsigned 8-bit integer; (c) "U16" represents an unsigned 16-bit integer; and (d) "volatile U32" represents a 32 bit integer which may be modified by external processes and thus must be reloaded before each use.

Each of these structural element data type representations are selected based on a number of factors, including, for example, microprocessor memory architecture requirements, available memory, and performance considerations. It can be appreciated that each respective structural elements desired data type may change in relation to changes in, for example, these factors, as outlined above.

5.3.1 Mirror Map Data Structure

Referring to Table 1, there is shown one embodiment of mirror map data structure 1000 (hereinafter, referred to as "mirror map 1000"), for representing up to one cache line's worth of data that is associated with a write data request from a host computer. (Such write data requests are known, and include, for example, conventional SCSI write data requests.)

At line 2, bitmap 1 ("bitmap1") represents data blocks 0–31. At line 3, bitmap 2 ("bitmap2") represents data blocks 32–63. At line 4, bitmap 3 ("bitmap3") represents data blocks 64–95. Finally, at line 5, bitmap 4 ("bitmap4") represents data blocks 96–127. The use of mirror map 1000 is discussed in greater detail below in reference to FIG. 8.

5.3.2 Sequence Data Structure

Referring to Table 2, there is shown an example of sequence data structure 2000 (hereinafter, referred to as sequence 2000), for maintaining, by a controller, a single large integer value as an array of unsigned integers. As will be discussed in greater detail below, two sequence 2000 data structures are associated with each cache line that is being mirrored by a controller to an alternate controller. Each sequence 2000 provides an indication of a time sequence associated with mirrored cache data in the event of an alternate, or partner controller failure.

At line 3, low word ("lowword") represents the low 32-bits of a 64-bit unsigned integer. At line 4, high word ("highword") represents the high 32-bits of the 64-bit unsigned integer. The 64-bit unsigned integer being a sequence number associated with a cache line.

5.3.3 System Block Data Structure 3000

Referring to Table 3, there is shown an example of system block data structure 3000 (hereinafter, referred to as system block 3000), according to one embodiment of the present invention, for identifying user data represented by a cache line descriptor data structure 5000 (described in greater detail below in section 5.3.5). As illustrated, system block data structure 3000 is comprised of the following structural elements: (a) at line 3, sector; at line 4, system drive ("sysdrv"); and (c) at line 5, type. We now describe each of these structural elements.

Sector (line 3) is an offset in 512 byte increments from the start of a storage area on a system drive. A system drive is a physical or logical amount of storage visible to a host computer. To illustrate a system drive, consider that in a RAID system a data storage system may be comprised of multiple disk storage devices configured as one or more logical disk drives. Each of these logical disk drives is a system drive. When a system drive is configured by a user, it is configured to contain a total number of sectors.

System drive (line 4, "sys_drv") is a system drive identifier. For an operating system such as Microsoft Windows NT, the host computer defines a logical drive number or, letter, or other descriptor, such as, for example, "F:", which in turn relates to a system drive number, such as, for example, system drive 1. Using this example, logical drive "G:" would in turn be mapped to system drive 2, and so on.

Type (line 5) is used by a controller to define what type of user data a corresponding CLD 5000 (described in greater detail below) is representing. For example, a type can be a RAID level 0 type, a RAID level 5 type, or a standard cache data type. RAID levels are known and discussed in greater detail above. Standard cache data types include, cache data used internally by controller 17 (see FIG. 2), such as, for example, parity data, and data associated with the write data request from the host computer.

5.3.4 Memory Track Data Structure

Referring to Table 4 there is shown an example of memory track data structure 4000 (hereinafter, referred to as "memory track 4000"), used by a controller to identify the particular memory, or cache line, in, for example, memory 40 (see FIG. 3) that is being used by a controller to perform a data transfer operation in response to an I/O request from a host computer.

To place the use of memory track 4000, by a controller, into context, each I/O process stores an array of memory track 4000 data structures representing the data being transferred, by the controller, either to a system drive (from a host computer) or from a system drive (to the host computer). Each memory track 4000 includes information with respect to up to one cache line's worth (in one embodiment 64 KB) of data.

Such information includes, for example, structural elements to indicate state information corresponding to a caching state of the memory track 4000 (memory track states are described in greater detail in section 5.3.4.1), a system drive address, a block count corresponding to a number blocks being used in a transfer operation, an indication of which blocks of data are being transferred in response to the transfer operation, and a reference to a cache line descriptor data structure (described in greater detail below). We now discuss such structural elements.

Memory address (line 3, "m_ad") indicates a starting address in RAM, or memory 40, of where data corresponding to a transfer operation is located. Memory byte count (line for, "m_bytecnt") indicates a number of bytes involved in a transfer operation. Memory block count (line 5, "m_blockCount) indicates a number of blocks in the host transfer operation. Cache line pointer (line 6, "clp") is a pointer that references a cache line descriptor data structure that contains other information corresponding to this cache line.

Memory flag (line 7, "m_flag") is used by a controller to store a current state of the memory track. Memory track states are described in greater detail at the end of this section. Such states indicate, for example, whether resources have already been allocated to perform a cache data mirror operation, or whether the cache data mirror operation for a cache line is complete.

Change map (line 8, "changeMap") is a mirror map 1000, for tracking which blocks referenced by a CLD 5000 are being referenced during a current, or last host transfer operation.

5.3.5 Cache Line Descriptor ("CLD") Data Structure

Referring to Table 5, there is shown an example of cache line descriptor ("CLD") data structure 5000 (hereinafter, referred to as "CLD 5000"), for maintaining and tracking, by a controller, a cache line in either user cache 110 (see FIG. 3) or mirror cache 115.

At line 3, mirror valid 1("mirrorValid1") is used by a controller to track whether a first mirror set is valid. A mirror set consists of a mirror Valid flag, a mirror Sequence number, and a mirror Map. A mirror set represents cache data stored in, for example, the partner controller. A mirror set is valid when, for example, the entire mirror set cache line descriptor and the cached data has been transferred to the partner controller without error. There are multiple mirror sets because the prior mirror set cannot be overwritten while a newer mirror operation is in progress. This is to protect against a mirror operation failing with only a portion of the newer data being written to the partner controller.

At line 4, mirror sequence 1 ("mirrorSequence1") is a sequence 2000 data structure (see Table 2) used by a controller (as discussed in greater detail above in reference to sequence type data structure 2000) to store a sequence number indicating a time-order in which cache data is mirrored to an alternate controller. The sequence numbers are required to protect against multiple copies of mirror information for the same system drive/sector being present in the mirror area. Through the use of the sequence number the survivor (after a failover, during the cache reorganization) controller can determine which is the more recent mirror information and only use that. This is possible since when a cache line is released and then reused, its linkage to a mirror entry is also broken. If a new write operation then occurs to the same system drive and sector as the released cache line, a new cache line and mirror entry must be obtained. If the older mirror entry has not been reused, there is the potential that both the older mirror entry and the new mirror entry will exist in the partner's memory concurrently.

At line 5, mirror map 1 ("mirrorMap 1") is a mirror map 1000 data structure used (described in greater detail above in section 5.3.1) by a controller to indicate which data blocks in a cache line have been mirrored. This is beneficial since only the blocks which have changed are mirrored to the partner controller.

At line 6, mirror valid 2 ("mirrorValid2") is a second set of mirror sets used by a controller to determine whether the second set of mirror sets, and a set of cache data that it represents, is valid. To illustrate the use of mirror valid 2, consider the following example, where the second set of mirror information: mirrorValid2, mirrorSequence2, and mirrorMap2, is used to allow the partner controller to always have at least one (except on the first mirror operation) valid mirror set on the partner controller. This is required to protect against a controller failure which occurs during the mirror operation. Since the prior mirror operation information is contained in one of the mirror sets, the other mirror set can be overwritten without causing a problem if the transfer fails.

At line 7, mirror sequence 2 ("mirrorSequence2") is a sequence 2000 data structure (see Table 2) used by a controller to store a sequence number indicating an order in which the cache data was mirrored to an alternate, or a partner controller.

At line 8, mirror map 2 ("mirrorMap2") is a mirror map data structure 1000 used (as described in greater detail above in reference to mirror map data structure 1000) by a controller to indicate which cache data blocks were mirrored. Mirror map 2 is associated with mirror valid 2, and mirror sequence 2.

At line 9, mirror entry pointer ("*mirrorEntry") is used by a controller to reference a mirror entry data structure 6000 (described in greater detail below in section 5.3.6).

At line 10, mirror operation ("mirrorOp") is a pointer to a mirror operation data structure 9000 as described in greater detail below in section 5.3.9.

At line 11, active host writes ("activeHostWrites") is used by a controller to keep a count of all active host writes to user cache data represented by this CLD 5000. This is beneficial because it enables the code to determine if data is being moved from the host into a cache line. It is used to help determine the parity generation algorithm for RAIDS writes. In addition, it is an indication that the cache line will soon have some additional dirty blocks if the host writes completes without error.

At line 12, block information ("1_blk") is used by a controller to indicate a system drive, sector, and type of user data represented by this CLD 5000. This is advantageous because it provides a unique identifier as to the cache line. A cache line can be uniquely identified in terms of its data through the system drive, sector, and the cache line type.

At line 13, valid blocks ("validBlocks") is a mirror map 1000 data structure (see section 1.3.1), for representing each of a set of data blocks that are valid in a data cache. Is desirable for every block written from a host computer, or every block read from a storage medium, to be marked by a controller as a valid block, for example, "1." This is advantageous because it provides a method to uniquely identify which data blocks in the cache line hold valid data. Valid data is data which is that which was most recently written by the host system.

At line 14, dirty blocks ("dirtyBlocks") is a mirror map 1000 (see section 5.3.1), for representing, by a controller, all blocks of data that are dirty in the data cache. It is desirable for every block written from a host computer in response to a write data request to be marked as a dirty block until it is written by the controller to a storage medium. In one embodiment, a data block is marked as a dirty data block by setting a corresponding bit in dirty blocks equal to "1." This is beneficial because it allows the code to track which blocks in a cache line have been written to the controller by the host system, but have not been written to the backing storage media by the controller.

At line 15, change map ("changeMap") is a mirror map 1000 (see section 5.3.1) used by a controller to represent those memory blocks in cache memory 40 that are being altered as a result of/or in response to a host write operation, a read from disk (backing storage media), a parity generation operation, or a data regeneration operation. This is when a disk has failed in a RAIDS system drive and must be rebuilt through an XOR operation.

5.3.6 Mirror Entry Data Structure 6000

Referring to Table 6, there are shown aspects of mirror entry data structure 6000 (hereinafter, referred to as mirror entry 6000), according to one embodiment of the present invention. Mirror entry 6000 is used by a controller to track the allocation and release of a mirror CLD 5000 (see Table 5) stored in an alternate controller'memory 40 (see FIG. 4)

In one embodiment, it is desirable for each cache data mirror process be represented in a mirroring controller by a respective mirror entry 6000. Each mirror entry 6000 is an element in a doubly linked list of mirror entry 6000 data structures. Each mirror entry 6000 contains a link to a next mirror entry 6000 (if one exists), and a previous mirror entry 6000 (if one exists). Doubly linked lists and the operation of doubly linked lists are known, and for this reason doubly linked lists are not discussed in greater detail herein.

At line 3, mirror index ("mirrorIndex") is used by a controller to represent a unique mirrorEntryType stored in controller data memory 40 on a controller. The "mirrorIndex" is used to keep track of an available mirrorEntryTypes on a "free list." Free list means that these data structures were pre-allocated and are used on an as-needed basis. When a mirrorEntryType is needed, an index is obtained from the free list. This index is used to access the mirrorEntryType in the array of mirrorEntryTypes.

A mirror index value (line 3) begins with a value of 0, represents the first mirror Entry Type in an array of mirror Entry Types. The value of mirror index can range from this beginning value to a value that represents a maximum number of CLD 5000 minus one.

At line 4, mirror cache line descriptor pointer ("*mirrorCld") references a CLD 5000 in an alternate controller's data structures 120 (see FIG. 3). This field is initialized once to the address of the CLD 5000 that it references in the alternate controller's memory.

At line 5, read/write cache line descriptor pointer ("*readWriteCld") references a CLD 5000 stored data structures 120 (see FIG. 3). The "*readWriteCld" identifies those cache lines whose data needs to be mirrored to an alternate controller.

At line 6, first mirror flag ("firstMirror") is used by a controller to determine if a mirror operation has ever previously been performed by the controller with respect to this memory cache line. The first time that a cache operation is performed by the controller with respect to a cache line, first mirror flag is set to equal true ("1").

At line 7, on free list ("onFreeList") is used by a controller to indicate whether or not this object is on.the free list. A free list represents those pre-allocated data structures which are not currently being used in a mirror operation, and which may be used in a new mirror operation. In one embodiment, a free list is comprised of a linked list of pointers to available data structures, and is created by a controller during an initialization sequence.

At line 8, using alternate ("usingAlternate") is used by a controller in response to a data cache operation that "overlaps" a previous data cache operation. Overlapping data is host write data which is being transferred in on top of data which was written to the controller at a prior time. The present invention does not need to re-cache data that has already been cached, because the host computer has already been informed that the overlapped data is safe, or cached. And, if, for some reason, the controller fails when the overlapped data is only partially cached, data may be lost. In light of this, an alternate mirror entry 6000 is used to prevent the new overlapping data from being mirrored on top of older mirrored data. In this manner, the overlapping data will instead be written to a new mirror cache line. Overlapping data is also avoided at a data block level, as is described in greater detail below.

At line 9, next free mirror entry 6000 pointer ("*nextFree") is used by a controller to reference a next free mirror entry 6000 on the free list, if any.

At line 10, previous mirror entry 6000 pointer ("*prevFree") is used by a controller to reference a previous free mirror entry 6000 on the free list, if any.

At line 11, alternate pointer ("*alternate") is used by a controller to reference an alternate mirror entry 6000, if any. (Use of each of these structural elements is described in greater detail below in section 5.4.)

5.3.7 Mirror Header Data Structure 7000

Referring to Table 7, there are shown aspects of mirror header data structure 7000 (hereinafter, referred to as mirror header 7000). Mirror header 7000 is used as a header to data that is cached by a controller, to an alternate controller. Mirror header 7000 provides addresses and byte counts of where data following it are to be placed in an alternate controller's memory. We now discuss the structural elements of mirror header data structure 7000.

At line 3, there is shown cache line descriptor count ("cld_count") for indicating to a controller the number of CLD bytes to be written to the cache line descriptor address ("cld_addr") location. The number of CLD bytes is based on the size of CLD 5000 (see section 5.3.5).

At line 4, cache line address ("cld_addr") is used by a controller to indicate an address in an alternate controller's memory 40 (see FIG. 3), of where to write, by the alternate controller, the CLD 5000 data bytes just mirrored.

At line 5, data count ("data_count") is used by a controller to indicate a byte count of the number of cache data bytes to be written by an alternate controller to the data address ("data_addr") location. The cache data bytes correspond to the data bytes that will subsequently be transferred by the controller to a system disk.

At line 6, data address ("data_addr") is used by a controller to indicate an address of where to write, by an alternate controller, data count cache data bytes.

At line 7, valid flag count ("valid_flag_count") is a byte count of the number of bytes in size the valid flag is, which needs to be transferred by a controller to an alternate controller. The valid flag is used by a controller to indicate that all bytes previous to the bytes indicated by valid flag count have already been transferred. Valid flag count is beneficial because it tells the I/O processor how many bytes of data the valid flag is, and hence how many bytes to transfer.

At line 8, valid flag address ("valid_flag_addr") is used by a controller to store an address indicating where to write the valid flag's data on an alternate controller in memory 40, FIG. 3.

5.3.8 Mirror Queued Data Structure

Referring to Table 8, there are shown aspects of mirror queued data structure 8000 (hereinafter referred to as mirror queued 8000), according to one embodiment of the present invention. This data type is used to manage multiple I/O Processes that are queued up on a mirror operation. As will be described in greater detail below in section 5.4, multiple host computer write data requests may be coalesced by the present invention into a single cache mirror operation to reduce the overhead cost of obtaining multiple mirror entries 6000 (see Table 6).

At line 3, memory reference ("mref") is used by a controller to store a reference to that memory maintained by an I/O process that is being mirrored.

At line 4, IOP queue table pointer ("iqtptr") is used by a controller to reference information that represents an I/O Process (I/O processes are discussed in greater detail above) and is used by a controller to store all pertinent information for a host computer read or write data request. Such information includes, for example, the system drive, the starting sector of the data transfer, and the number of blocks to transfer.

At line 5, next mirror queued data structure pointer ("next") is used by a controller to reference a next mirror queued 8000 in a singly linked list. Singly linked lists and the operation of singly linked lists are known, and for this reason, singly linked lists are not discussed in greater detail herein.

At line 6, last mirror queued data structure pointer ("last") is used by a controller to reference a last mirror queued data structure 8000 in a singly linked list. The structural element is beneficial because it provides an efficient, or fast way for a controller to add another mirror queued data structure 8000 to the end of the singly linked list of mirror queued data structures 8000.

5.3.9 Mirror Operation Data Structure

Referring to Table 9, there are shown aspects of mirror operation data structure 9000 (hereinafter, referred to as mirror operation 9000), according to one embodiment of the present.invention. Mirror operation 9000 is used by a controller to: (a) manage writing data to an alternate controller on a disk channel; (b) keeping track of multiple write data requests from a host computer that have been coalesced into one cache mirror operation; and (c) manage queues of multiple I/O processes managing respective write data requests, while waiting for a cache mirror operation to complete.

A disk channel is a communications path, for example, bus 25 (see FIG. 1), owes which controllers in active configuration can communicate. Disk channels and the operation of disk channels are known, and for this reason disk channels will not be discussed in greater detail herein.

At line 3, "used" is a counter that indicates to a controller, how many I/O Processes are using the mirror operation represented by this mirror operation 9000.

At line 4, "reply" is used by a controller as a location whose address will be passed to a system disk I/O processor, as a means of receiving back from the system disk a status corresponding to a drive command. Drive commands are known.

At line 5, retry count ("retry_count") is used by a controller to store an indication of how many times an attempt was made by the controller to retry the mirror drive command. A mirror drive command is, for example, a drive command being used for the specific operation of copying data from one controller to its partner.

At line 6, channel is used by a controller to indicate a drive channel that this mirror operation is using to transfer user cache data to an alternate controller.

At line 7, cache line descriptor pointer ("clp") is used by a controller to reference a CLD 5000 stored in user cache 110 (see FIG. 3)that is being mirrored to an alternate controller.

At line 8, valid flag ("valid_flag") is used by a controller to store a valid value. The primary problem which the valid flag solves is when the controller which is transferring data dies in the middle of the transfer, thus leaving the surviving controller with part valid data and part unknown data. A valid value is any value is used by a controller to indicate that the entire data transfer has completed, and thus, the data can be marked valid or usable. When a data transfer begins between controllers, the valid flag is first set to indicate that the transfer has not completed. If the data transfer completes without error, the valid flag is set to indicate all of the newly transferred data is good. Without the valid flag there is no method of determining, by a controller, if a data transfer completed without errors.

At line 9, drive command pointer ("dp") is used by a controller to reference a drive command (DRVCMD) that is being used to transfer cache data and all other mirror related bytes to the alternate controller's memory 40. Drive commands are known.

At line 10, mirror header data 7000 ("mssg") is used by a controller to store addresses and bite counts of all data being sent to an alternate controller in response to a cache mirror operation. Mirror header 7000 and its associated structural elements are described in greater detail above in section 5.3.7.

At line 11, mirror in progress ("mirrorInProgress") is used by a controller to indicate that a cache mirror operation is in progress. In one embodiment, mirror in progress is set to equal "1" when a drive command has been submitted by a controller for the purpose of mirroring cache data. In this same embodiment, mirror in progress is set to equal "0" when either the drive command has completed successfully, or the controller has timed out the drive command because it did not complete within a predetermined amount of time. The predetermined amount of time is set to 250 milliseconds, a value determined by the SSCI specification.

At line 12, "sending" is a boolean value (such as a flag or other indicator) used by a controller to indicate that a mirror operation has been initiated by a controller with an alternate controller. The boolean value sending allows the present invention to coalesce all possible write data requests that have completed up to the point that mirror in progress (line 11) is set to indicate that a mirror operation is in progress. Sending is set to false ("0") once a drive command is submitted to the I/O processor queue for the mirror write. Sending is set to true ("1") when a new mirror operation is started to be built up for sending to the partner controller.

At line 13, mirror map index ("mirrorMapIndex") is used by a controller to indicate which mirror set (mirror set 1 or mirror set 2) is being used for the current mirror operation. A mirror set includes, for example, a mirror valid flag, a mirror sequence number, and a mirror map. See Table 5, lines 3, 4 and 5 make up one set, lines 6, 7 and 8 make up the other set. Only one mirror set may be used for a mirror operation at any one time. The mirror set alternates between mirror operation, such that if the mirror is used multiple times there is a prior mirror set and a current (or being transferred) mirror set active.

At line 14, mirror map ("mirrorMap") is a mirror map 1000 data structure (see Table 1). According to the procedures discussed in greater detail above, mirror map is used by a controller to indicate individual data blocks of a cache line.

At line 15, "waiting" is used by a controller to indicate how many I/O Processes are waiting for an mirror operation that has not yet completed. An I/O process will wait for a mirror operation that has not completed because the data has not been transferred in its entirety to an alternate controller. When the mirror operation completes, it marks all of the waiting processes with a status indicating if the mirror operation completed successfully or with an error. After the mirror operation completes successfully, the I/O process will send status back to the host and place the dirty cache line onto the write back queue. In the event the mirror operation completes with an error, the I/O process may retry the mirror operation. In the event of a retry, there is a maximum number of retries, after which the partner controller will be killed. The maximum number of retries can be any number. In one embodiment of the present invention the maximum number of retries is set to 8.

At line 16, tracks waiting pointer("*tracksWaiting") is used by the controller to reference a singly linked list of mirror queued 8000 data structures that represent all waiting I/O Processes. Mirror queued 8000 is discussed in greater detail above in section 5.3.8.

At line 17, coalesced is used by a controller to indicate how many I/O Processes have been coalesced into a single mirror operation represented by this mirror operations 9000.

At line 18, tracks coalesced pointer ("*tracksCoalesced") is used by a controller to reference a singly linked list of mirror queued 8000 data structures (see Table 8) which represents each I/O Process that was coalesced by a controller into a single cache mirror operation represented by this mirror operation 9000.

5.3.10 Data Structure Relationships

As noted above, each cache line in user cache 110 (see FIG. 3) is explicitly linked by a data structure to a respective mirror cache line in mirror cache 115 located on an alternate controller.

To illustrate explicit linking, refer to FIG. 4, where there is shown a block diagram of an exemplary memory layout scheme between two controllers, according to one embodiment of the present invention. For purposes of this example, a first controller ("controller 1") is an alternate controller with respect to a second controller ("controller 2"). Similarly, the second controller ("controller 2") is an alternate controller with respect to the first controller ("controller 1").

Controller 1 has memory 40-1, which in turn stores data structure 21-1, that has pointer reference 41 referencing cache line 11-1. Data structure 21-1 explicitly links cache line 11-1 through pointer reference 43, which references mirror cache line 16-2 on alternate controller 2. In a similar manner, each other respective cache line, for example, cache line J-1, in user cache 110-1 in controller 1, is linked to a corresponding mirror cache line, for example, mirror cache line N-2, in mirror cache 15-2 in alternate controller 2.

Analogously, controller 2 has memory 40-2, which in turn stores data structure 21-2, having pointer reference 49 that references cache line 11-2. Data structure 21-2 explicitly links cache line 11-2 through pointer reference 51 to mirror cache line 16-1 on alternate controller 1. In a similar manner, each other respective cache line, for example, cache line J-2, in user cache 110-2 in controller 2, is linked to a corresponding mirror cache line, for example, mirror cache line N-1, in mirror cache 115-1 in alternate controller 1.

Referring to FIG. 5, there are shown aspects of a set of data structure relationships providing such explicit linking, according to one embodiment of the present invention. In view of this disclosure, it can be appreciated that a person of ordinary skill in the art could form a different set of structural relationships than the set of structural relationships shown in FIG. 5, without departing from the spirit an d scope of this disclosure.

Memory track data structure 4000-X includes a reference to a CLD 5000-X (see line 6, Table 4). CLD 5000-X includes a reference to mirror entry 6000-X (see line 9, Table 5). We now discuss the structural references contained in mirror entry 6000-X.

Mirror entry 6000-X includes the following references: (a) a reference to mirror CLD 5000-XA (see line 4, Table 6) stored in mirror cache 115 (see FIG. 3); (b) a reference to read/write CLD 5000-XB (see line 5, Table 6), a CLD 5000-X that is stored in user cache 110 (see FIG. 3); (c) a reference to a next mirror entry 6000-XA (see line 9, Table 6); (d) a reference to a previous mirror entry 6000-XB (see line 10, Table 6); and (e) a reference to an alternate mirror entry 6000-XC (see line 11, Table 6).

CLD 5000-X also includes a reference to mirror operation 9000-X (see line 10, Table 5). We now discuss the structural references contained in mirror operation 9000-X.

Mirror operation 9000-X contains a reference to a drive command (see line 9, Table 9). Mirror operation 9000-X contains a reference to mirror header 7000-X (see line 10, Table 9). Mirror operation 9000-X contains a reference to mirror map 1000-X (see line 14, Table 9). Mirror operation 9000-X contains a reference to mirror queue 8000-XA (see line 16, Table 9), representing a linked list of memory tracks 4000. Mirror operation 9000-X contains a reference to mirror queue 8000-XB (see line 18, Table 9), representing a linked list of memory tracks 4000 that have been coalesced by cache data mirror process 300 (see FIG. 3).

5.4 SOFTWARE PROCEDURE LEVEL ARCHITECTURE 5.4.1 Bootstrap Process 100

After a controller, for example, controller 17 (see FIG. 2), is powered on, it performs bootstrap procedure 100, which comprises a set of initialization procedures to prepare a controller so that it can, for example, read data requests and write data requests, from a host computer. Such initialization procedures include, for example, loading executable application code such as those application codes above, into code 105(see FIG. 3).

Bootstrap process 100 also stores in reserved/queues 5, system configuration data, such as, for example, the number and physical properties of disk storage devices in a data storage system.

After bootstrap process 100 completes its initialization process, cache memory initialization process 200 allocates all remaining bytes of memory 40 (or optional cache memory 60) (see FIG. 3) for cache related data and data structures, such as, for example, those data structures described above in section 5.3. We now discuss cache memory initialization process 200.

5.4.2 Cache Memory Initialization Process 200

Cache memory initialization procedure 200 (see FIG. 6) sets up a memory, for example, either memory 40, or cache memory 60 (depending on whether optional cache memory 60 is available and being used by a controller), to accommodate data and data structures used by procedures of the present invention to: (a) mirror data to an alternate controller; (b) store mirrored data sent from an alternate controller to a controller; and (c) use mirrored data to complete or takeover tasks that were in progress or scheduled to be performed by an alternate controller that has failed.

For purposes of simplifying the description, we discuss cache memory initialization process 200 with respect to initializing memory 40. However, it can be appreciated that in the event that optional cache memory 60 (see FIG. 2) is used, the procedures required for cache memory initialization process 200 to initialize optional cache memory 60 are analogous to the procedures required to initialize memory 40 (with the exception that all of cache memory 60 would be used for such data and data structures as compared to a proportional amount as discussed in greater detail below).

Referring to FIG. 6, there is a flowchart illustrating aspects of cache memory initialization process 200, according to one embodiment of the present invention. At step 205, memory 40 is allocated in a predefined manner.

At step 205, a determination of how much memory 40 to allocate for user cache, mirror cache, and associated data structures is made. For optimal performance of the present invention, it is desirable for cache memory initialization process 200 to allocate memory 40 that is not already occupied by reserved/queues 25 and code 105 according to the following percentiles: (a) 70 percent of the free memory is allocated for user cache 110 (see FIG. 3) and associated data structures, such as, for example, CLD 5000 data structures; and (b) 30 percent of the free memory is allocated for mirror cache 115 and associated data structures, including, for example, mirror entry 6000, CLD 5000, mirror operation 9000, and mirror queued 8000 data structure. These percentages are exemplary and may be modified to optimize performance.

To illustrate this, consider the following example, where memory 40 is comprised of 8 MB of RAM. In this example, code 105 and reserved/queue 25 memory block 5 occupy two megabytes of RAM, thereby leaving 6 MB of RAM for user cache 110, mirror cache 115, and data 120. According to the desirable memory allocation percentiles discussed above, 4.2 megabytes of RAM will be allocated for user cache 110 and associated data structures, and 1.8 MB of RAM will be allocated for mirror cache 115 and associated data structures.

It can be appreciated that the amount of RAM allocated according to the above percentiles may be rounded up to the nearest whole number, or rounded down to the nearest whole number and that different percentiles may be used. For example percentiles varying by at least 50% for those identified may be used. To illustrate this, consider, for example, that 1.8 megabytes of RAM equates to 2 MB of RAM being allocated, and 4.2 megabytes of RAM equates to 4 MB of RAM being allocated. It can also be appreciated that as the amount of RAM in a controller, for example, controller 17 (see FIG. 2), increases that the respective user cache and mirror cache allocations discussed above will increase accordingly.

Optimal performance of the present invention is based on a number of factors, including, for example, providing enough RAM to satisfy all host requests or a percentage of host reads and writes and allowing for large code sizes. Therefore, it can be appreciated that if any of these factors change, for example, code size increases, RAM size decreases, or percentile changes in the number of read and write data requests, the above discussed percentile allocations of free memory may be adjusted accordingly to accommodate such changes.

At step 210, data structures associated with user cache 110, and mirror cache 115, are pre-allocated into free lists of data structures. Free lists are discussed in greater detail above.

At step 215, data structures in data structure 120 are initialized to default values. In one embodiment, each CLD 5000 data structure is initialized to represent no valid blocks (see Table 5, line 13), no dirty blocks (see Table 5, line 14), and all mirror fields (see Table 5, lines 3, 4, 5, 6, 7, 8, 9, and, 10) are set to equal zero. Also, a mirror entry type pointer variable (not shown) is initialized to point to a first mirror entry 6000 data structure, then all other mirror entry 6000 data structures are linked together into a doubly linked list through the next free pointer (Table 6, line 8) and previous free pointer.

Every mirror entry 6000 is initialized as follows: the mirror index ("mirrorIndex") is set to equal the mirror CLD 5000 that it is representing the on free list flag ("onFreeList") is set to true, and all other structural elements are zeroed.

5.4.3 Cache Data Mirror Process 300

In a preferred embodiment, all cache mirror operations begin as a result of a controller receiving a write data request from a host computer writing data to a system drive that is configured with a policy of write-back. A policy of write-back means that a controller will first store data associated with a write data request into user cache 110 (see FIG. 3). Next, after caching the data, a controller will return a corresponding status to the requesting host computer before the data is written to a disk drive. A policy of write-back is typically set by a user when a system drive is first created during initial setup and configuration.

Referring to FIG. 7, there is shown a flowchart illustrating aspects of an embodiment of cache data mirror process 300. At this point, a controller, for example, controller 17 (see FIG. 2), has performed bootstrap procedures 100, has initialized cache memory (cache memory initialization process 200), and is capable of processing write data requests from a host computer.

Cache data mirror process 300 (hereinafter referred to as a "CDMP 300") receives a write data request 305 from a host computer requesting that a set of data be stored to a system drive by the controller. At step 307, I/O Processing 20200 locates a number of free cache lines in user cache 110 (see FIG. 3). The number of free cache lines that are required depends on how many sectors the host is writing. In one embodiment, a free cache line is found by performing a hash table lookup, or retrieving a cache line from a least recently used ("LRU") table. Procedures for performing hash table lookup and LRUs are known.

At step 310, each data structure, for example, memory track 4000 (see Table 4), representing a cache line's worth of data in the IOP that is managing write data request 305 is mapped to a respective free cache line (see Step 7).

In one embodiment, each memory track 4000 (see Table 4), cache line descriptor pointer (see "clp", line 3, Table 4) is set to equal the address of a CLD 5000 representing a respective free cache line.

At step 315, Index J is set to equal zero (0). Index J is used to iterate through each cache line of data being written to the controller and subsequently mirrored to an alternate controller in response to receiving write data request 305.

At step 320, a host interface module in I/O Processor 22 (FIG. 2) is then commanded by code executing in CPU 15 (FIG. 2) to transfer data from a host bus, for example, host peripheral bus 10 (see FIG. 1), into cache line [J]. In one embodiment, MEM::clp (see line 3, Table 4) indicates where into user cache 110 the host data is being transferred. In one embodiment, MEM:m_flag (see line 4, Table 4) is set to equal mirror setup state.

At step 325, it is determined whether this controller has established a nexus with an alternate, or partner controller in a data storage system, for example, data storage system 100 (see FIG. 1). For purposes of the present invention, a nexus is established when this controller and one other controller in the data storage system are managing the data storage system in dual active controller configuration, as illustrated, for example, in FIG. 1.

At step 345, if a nexus between controllers has not been established (step 325), it is determined if there are any more cache lines to process. If so, at step 350, index J is set to equal J plus one. Otherwise, CDMP 300 ends.

If a nexus between controllers was established (step 325), at step 335 it is determined whether a write-back policy is associated with the targeted system drive. If not, the procedure continues at step 330 as described in greater detail above.

At step 340, if a write-back policy is associated with the targeted system drive (step 335), data cache line [J] is mirrored to an alternate controller's cache. Procedures associated with step 340 are described in greater detail below in reference to FIG. 8.

At step 345, it is determined if there is more data to transfer. If so, at step 350, index J is set to equal J plus one. Otherwise, if there is no more data to transfer (step 345), then CDMP 300 ends.

Referring to FIG. 8, there is a flowchart illustrating aspects of CDMP 300, step 340 (see FIG. 7), according to one embodiment of the present invention.

The present invention maintains two mirror maps per cache line. Each mirror map includes a number of bits, wherein each bit represents a block of data. For example, mirror map 1000 (see Table 1). See also, line 5, "mirrorMap1", and line 8, "mirrorMap2", Table 5.

A block of data typically includes 512 bytes of data. A cache line of data typically includes up to 64 KB of data. 64 KB (bytes in a cache line) divided by 512 (bytes in a block) is equal to 128. Therefore, in a desired embodiment, each mirror map is comprised of one-hundred-twenty-eight (128) bits, where each bit represents a block of data in a cache line.

To illustrate the use of a mirror map by CDMP 300 (see FIG. 3 and FIG. 8), consider the following example. If a write data request is received from a host computer indicating that one block (or less) of data is to be written to a disk drive array, and this data is to be mirrored to an alternate controller, the bit in bitmap 5 that is mapped to block 1 is set to equal "1." For example, bitmap1 [0] is set to equal "1."

In yet another example, if a write request from a host computer is received that indicates that three blocks of data are to be written to a disk drive array, and these blocks are to be mirrored by a controller to different controller, the bits in bitmap 5 that are mapped to the first five blocks are set to equal "1," for example: bitmap1[0] is set to equal 1; bitmap1 [1] is set to equal 1; and, bitmap1[2] is set to equal 1. In this manner, blocks of data are represented by a mirror map.

The present invention maintains two mirror maps per cache line, because if a subsequent mirror operation fails, or, for any reason is incomplete, the identity of data blocks mirrored during a previous mirroring operation for cache line[J] remain intact. This procedure, thereby provides a higher level of data availability to data storage systems as compared to the state of the art.

At step 405, it is determined which mirror map, of two mirror maps, to use for this mirror operation. In one embodiment, a first sequence number and a second sequence number are utilized, by a controller, to keep track of which of the first or second mirror maps to use. (See, for example, mirror sequence 1 (line 4, Table 5), and mirror sequence 2, (line 7, Table 5)). The sequence numbers are alternately incremented in response to each respective cache line [J] data mirror operation. The sequence number that is the greater of the two sequence numbers represents the mirror map containing an indication of the most recently mirrored data blocks from cache line[J]. Therefore, a subsequent mirroring operation will write to the mirror map represented by the sequence number that is the least of the two sequence numbers.

For a first mirror operation with respect to cache line [J], all bytes of cache line [J] are mirrored, the first mirror map is used, and the first sequence number is incremented. To keep track of the most recently used mirror map, a mirror map index (see line 13, "mirrorMapIndex", Table 9) is set to equal one (1) or two (2), respectfully representing a first mirror map or a second mirror map.

At step 410, it is determined if a mirror operation is already in progress. In one embodiment, this is accomplished by determining whether mirror operation 9000 data structure mirror in progress structural element (see line 11, "mirror in progress", Table 9) is set to equal true ("1").

At step 415, if a mirror operation is already in progress (step 410), the I/O process associated with write data request 305 is added to a wait queue. An I/O Process will wait for a current mirror operation to complete to ensure that all of the data associated with the current mirror operation is transferred by a controller to an alternate controller. An I/O process added to the wait queue is rescheduled for mirroring its associated data to an alternate controller.

In one embodiment of the present invention, mirror operations 9000 "waiting" (see line 17, Table 9) is incremented by one, to indicate that this I/O Process is waiting for the current mirror operation to complete. Also, mirror queued 8000 data structure I/O Process pointer ("qtptr, line 4, Table 1) is set to reference this I/O Process. Mirror Queue 8000 is added to MirrorOpType::Tracks; Waiting ("tracksWaiting", line 16, Table 9) singly linked list.

At step 420, if a mirror operation is not in progress (step 410), it is determined whether another host write data request 305 is in progress while this mirror operation is being setup. In one embodiment, this is accomplished by determining whether active host writes (see line 11, "activeHostWrites", Table 5) is greater than "0". If a host I/O request is not in progress (step 20), CDMP 300 continues at "B," as discussed in greater detail below in reference to FIG. 9.

At step 425, if another host write data request is in progress (step 420), this mirroring operation for cache line [J] is performed at the same time, or coalesced with the mirroring operation that will be setup with respect to the write data request that is in progress.

In one embodiment, this is accomplished by allocating a mirror queue type 8000 (Table 8) data structure, storing the I/O process identifier, memory track index, and adding mirror queue 8000 to tracks coalesced (line 18, Table 9), and "ORing" in the blocks being written to the mirror map (line 13, Table 9) as discussed in greater detail above. The I/O Processes status of cache line [J] (see line 7, "m_flag, Table 4) is set to indicate that it is waiting indicating that this cache line will be mirrored during the next mirroring operation with at least one other cache line associated with another I/O Process. CDMP 300 continues at "A," as discussed in greater detail above in reference to FIG. 7.

Referring to FIG. 9, there are shown other aspects of CDMP 300, according to one embodiment of the present invention. At step 430, a flag is set to notify any other mirror operations that may start up subsequent to this mirror operation, that this mirror operation has begun, but that the data associated with the write data request has not yet been written to disk by the controller. In one embodiment, this is accomplished by setting sending structural element (see line 12, Table 9) equal to true ("1"). This is beneficial because the present invention may coalesce subsequent mirror operations with this mirror operation.

At step 435, it is determined whether mirror cache line data overlap will occur as a result of this mirror data operation. Overlap occurs when the host writes data to the same location on a system drive on two separate writes. Mirroring such "overlapping data" may result in loss of previously mirrored data if the mirror operation fails, or for any reason, is incomplete. Because the host computer may have already been informed, by the controller, that the data was successfully written to disk, it is desirable to protect previously mirrored data.

If this is the first mirror operation for this cache line [J], then no mirror overlap will occur. In one embodiment, to determine this, the value of the boolean flag, for example, first mirror (line 5, Table 6), is examined. If it is determined that this is the first mirror operation, the procedure continues at step 445, as described in greater detail below.

If this is not the first mirror operation for this cache line [J], in one embodiment, to determine whether a mirror operation will overlap with a previous mirror operation (step 435), first, a bit-wise, logical "OR" operation is performed using the "old" mirror map (see line 14, Table 9) and change map,(see line 8, Table 4). "Old" mirror map represents those data blocks that were previously mirrored for this memory track [J]. Whereas, change map indicates which data blocks a host computer is transferring with respect to a present write data request operation and memory track [J]. As discussed in greater detail above, a pair of sequence numbers are used to determine a time order for memory maps.

In this embodiment, if mirror map index (see line 13, Table 9) is equal to "1", indicating that our last mirror operation used the second mirror map (for example, see line 8, "Mirror Map 2", Table 5), then, a bit wise, logical "AND" operation is performed on the results from the previous logical "OR" operation and the second mirror map.

Otherwise, if mirror map index (see line 13, Table 9) is equal to 2, indicating that our last mirror operation used a first mirror map (see line 5, "mirrorMap 1", Table 5), then a bit wise, logical "AND" operation is performed on the results from the previous logical "OR" operation and the second mirror map. If the result of the logical "AND" operation is equal to zero, then there is no data overlap because no bits were set in the change map and the newly created overlap bit map data structure. This indicates that we are not writing to data blocks that were previously mirrored.

If the result of the logical "AND" operation is not zero, an overlap condition exists and this mirror operation must use an alternate mirror entry, because the firmware does not want to mirror new data blocks directly over previous mirror blocks that have not been committed to disk. Once they are committed to disk the previous mirror map, either the first or the second mirror map, is cleared so we will not detect overlap on the next mirror operation.

At step 440, memory overlap is detected (step 435), the mirror operation is setup to mirror cache line[J] data to an alternate mirror cache line. In one embodiment, to accomplish this, if using alternate (see line 8, Table 6) is true, or not equal to zero, then an alternate mirror entry 6000 (see Table 6) has already been allocated for this memory track [J]. Otherwise, a mirror entry 6000 (see Table 6) data structure is allocated and linked to the CLD 5000 associated with this cache line[J] memory track 4000 (see FIG. 5), by setting read write CLD pointer (see line 5, Table 6) equal to the address of the CLD 5000.

Next, the current mirror entry 6000 and the new mirror entry alternate 6000 are cross linked. This is accomplished by setting alternate pointer (see line 11, Table 6) in the current mirror entry 6000, equal to the address of the newly allocated mirror entry 6000 alternate. We also set the alternate pointer (line 11, Table 6) of the newly allocated mirror entry equal to the address of the mirror entry 6000. Next, we update the first mirror flag of the newly allocated mirror entry to true or "1" (the first mirror flag is line 6, Table 6). Next, the CLD 5000 (line 3, Table 4) is modified to reference the newly allocated mirror entry 6000 alternate by setting mirror entry pointer (see line 9, Table 5) equal to the address of the newly allocated mirror entry 6000 alternate. Finally, using alternate flag (see line 8, Table 6) is set to equal to true ("1"), to indicate that an alternate mirror entry 6000 is being used to perform the present mirror cache operation to prevent the problems discussed in greater detail above with respect to mirror operation overlap. In this manner, CDMP 300 sets up the mirror operation to mirror to an alternate mirror cache line.

At step 445, it is determined whether the data in this cache line has already been written, by the controller, to a disk drive. In one embodiment, this is accomplished by checking dirty blocks (see line 14, Table 5), wherein each data block that has not yet been written to the system drive is marked as "dirty", or a "1" in the dirty blocks bitmap. If the data in this cache line has already been written, by the controller, to a disk drive, at step 450, a flag is set to indicate that a mirror data operation does not need to be performed by the controller with respect to cache line[J]. In one embodiment, this is accomplished by setting mirror track 4000 state (see line 7, "m_flag," Table 4) to mirror complete state. CDMP 300 continues at "A," as illustrated in FIG. 7.

At step 455, if the data in this cache line has not been written, by the controller, to the system drive (step 445), a header, such as, for example, mirror header 7000 (see Table 7), is prepared with information that will facilitate the mirroring of the data by an alternate controller. Such information includes, for example, (a) a copy of a data structure that can be used by the alternate controller to access the mirrored data in case of this controller's failure [i]; (b) a byte count of the data associated with cache line [J]; and (c) an address in the alternate controller's memory of where the alternate controller will write the data associated with cache line.

In one embodiment, a CLD 5000 data structure (see Table 5) is a data structure that can be used by the alternate controller to access the mirrored data in case of a mirroring controller's controller's failure.

In one embodiment, the number of bytes to transfer is determined according to the following procedure. First, the mirror map that identifies the data blocks to be mirrored is determined through the use of sequence numbers, as described in greater detail above; Next, the byte count is set to equal the number of dirty cache blocks (in one embodiment this is identified by "dirty blocks," see line 14, Table 5) data blocks being transferred multiplied by the byte count in a data block, plus: (a) if mirror map 1 is being used, the size of mirror sequence 1, (see line 4, Table 5), mirror valid 1 (see line 3, Table 5), and mirror map 1, (see line 5, Table 5); or (b) if mirror map 2, is being used, the size of mirror sequence 2, (see line 7, Table 5), mirror valid 2 (see line 6, Table 5), and mirror map 2, (see line 8, Table 5)

Next, the alternate controller is provided with a way to determine that a mirror data operation is complete, or is not complete, so that an incomplete mirror operation will result in an invalid cache line that will not be processed by the alternate controller in the instance of this controller's failure (see Failover Process 500, described in greater detail below). In one embodiment, this is accomplished by setting mirror valid 1 (see line 3, Table 5) and mirror valid 2 (see line 6, Table 5) both equal to invalid ("0") to indicate the beginning of the mirror operation. Upon completion of the mirror operation, this controller will provide a mirror operation complete indication to the alternate controller.

At step 460, a mirror cache data request command 700 is sent to the alternate controller. Referring to FIG. 13, there is shown a block diagram illustrating aspects of a mirror cache data command 700. In response to receiving such a command, guilt and controller will execute mirror write process 500.

5.4.4 Mirror Write Process

Referring to FIG. 10, there is shown a flowchart illustrate aspects of mirror write process 500, according to one embodiment of the present invention. FIG. 10 illustrates a procedure followed by a controller upon receipt of a mirror cache data request 305 from an alternate controller. At step 530, in response a controller 17, in response to receiving a mirror cache data request 700 (see FIG. 13), will write the data 720 into the memory specified by address 710.

Referring to FIG. 11, there is shown a flowchart illustrate aspects of mirror write process 500, according to yet another embodiment of the present invention. At step 510, certain information is extracted from a header of the mirror cache data request 305. Such certain information includes, for example: (a) an address in the alternate controller's memory of where the alternate controller will write the data associated with cache line [J]; (b) a byte count of the data associated with cache line [J]; and (c) a copy of a data structure that can be used by the alternate controller to access the mirrored data in case of this controller's failure.

In one embodiment, the controller first, accesses the mirror header 7000 (see Table 7) by reading size of mirror header 7000 (Table 7) bytes into memory from bus 25 (see FIG. 1). As described in greater detail above in section 5.4.7, mirror header 7000 contains a number of structural elements that respectively point to data byte counts, and data locations.

At step 515, the data structure used to maintain the mirrored cache line is stored into data structure 120 (see FIG. 3) on the alternate controller. In one embodiment, this is accomplished by using CLD address (see line 4, "cld_addr," Table 7) is used to identify the location of a CLD 5000 data structure, and used to copy CLD count (see line 3, "cld_count", Table 7) number of bytes of the CLD 5000 data structure (see Table 5) into, for example, memory 40 (see FIG. 3). All cld_count bytes are transferred.

At step 520, the data associated with the write data request from the host computer is copied into mirror cache 115 (see FIG. 3). In one embodiment, to accomplish this, data count bytes (see line 5, data_count", Table 7) are transferred from data address (see line 6, "data_addr", Table 7) into mirror cache 115.

At step 525, valid flag count number (see line 7, "valid_flag_count", Table 7) of valid flag data is copied from valid flag address (see line 8, "valid_flag_addr", Table 7) into data structures 120, of memory 40 (see FIG. 3). This step completes the transfer of the valid flag, which overwrites mirror valid 1 (see line 3, Table 5) or mirror valid 2 (see line 6, Table 5), depending on which address was used. During a failover procedure (described in greater detail below), the controller uses the valid flag to determine which mirror operations/transfers were successful and saves only that data.

5.4.5 Failover Process

Failover process 600 is called after a controller has detected that an alternate controller has failed. Methods of detecting a failed controller in dual active systems are known. Because the failed controller may not have completed its I/O tasks before failing, this procedure writes all of the cache lines to disk that have been mirrored to this controller by the failed controller. There is a possibility that same data blocks will be written to a disk drive two times, once by the failed controller and once by this controller, but this does not invalidate the data, it only adds extra disk operations.

Referring to FIG. 11, there is shown a flowchart illustrating aspects of failover process 600 (see FIG. 3), according to one embodiment of the present invention.

At step 605, the number of cache lines in mirror cache 115 (see FIG. 3) is determined by the same steps taken during the cache initialization process 200, described in greater detail above. At step 610, cache line index K is set to equal zero. Cache line index K will be used to iterate through each of the cache lines in mirror cache 115. At step 615, all dirty data block indications (see "dirty blocks", line 15, Table 5) for cache line [K] are cleared, or set to equal zero, indicating that no data blocks of the cache line [K] need to be written to the system drive. This is done so that the actual data blocks that need to be written to a disk drive can be determined in subsequent steps if cache line [K] is valid, as described in greater detail below.

In one embodiment, we must first determine which mirror map to use. Because of coalescing the dirty block (see line 15, Table 5) may not match the mirror map (see lines 5 and 8, Table 5). At step 620, it is determined whether cache line [K] is valid. A cache line may not be valid because the system drive to which a cache line belongs has a policy of write-through. As discussed in greater detail above, a controller will not mirror cache data to an alternate controller if the policy of the system drive is write-through as compared to write back. In one embodiment, if both mirror valid flags (see. lines 3 and 6, Table 5) are cleared, or equal to zero, cache line [K] is invalid and is not written to disk.

At step 625, if the cache line is not valid (step 20), cache line index K is set to equal K plus one. At step 630, it is determined whether the cache line index is equal to the number of cache lines (step 10) minus one. If so, each cache line has been processed by failover process 600. Otherwise, failover process 600 continues at step 615, as described in greater detail above.

At step 635, because the cache line is valid (step 620), the identity of the data blocks to send to the disk drive are determined. At step 640, it is determined whether any data was identified to send to the disk drive (step 635). If this cache line does not have any data to send to the disk drive (step 640), failover process 500 continues at step 625, as described in greater detail above.

At step 650, cache line [K] is added to a hash table so as to allow cache hits to it. At step 655, cache line [K] is added to a write-back queue, where it is scheduled to have each of the data blocks that have not yet been written to the disk drive, written, by the controller, to the disk drive.

6.0 ALTERNATIVE EMBODIMENTS

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

TABLE 1

Bit Map Type Data Structure 1000

| 1 | typedef struct { | |
| --- | --- | --- |
| 2 | U32 bitmap1; | // bits 0–31 |
| 3 | U32 bitmap2; | // bits 32–63 |
| 4 | U32 bitmap3; | // bits 64–95 |
| 5 | U32 bitmap4; | // bits 96–127 |
| 6 | } BitMapType; | |

TABLE 2

Sequence Type Data Structure 2000

| 1 | typedef struct__SequenceType |
| --- | --- |
| 2 | { |
| 3 | U32 lowWord; |
| 4 | U32 highWord; |
| 5 | } SequenceType; |

TABLE 3

System Block Data Type 3000

| 1 | typedef struct__SYS_BLOCK |
| --- | --- |
| 2 | { |

TABLE 3-continued

System Block Data Type 3000

| 3 | U32 sector; |
| --- | --- |
| 4 | U32 sys__drv; |
| 5 | U32 type; |
| 6 | |
| 7 | } SYS__BLOCK; |

TABLE 4

Memory Track Data Structure 4000

| 1 | typedef struct__MEM | |
| --- | --- | --- |
| 2 | { | |
| 3 | U32 | m__ad; |
| 4 | U32 | m__bytecnt; |
| 5 | U32 | m__blockCount; |
| 6 | CLD__TYPE | *clp; |
| 7 | volatile U32 | m__flag; |
| 8 | BitMapType | changeMap; |
| 9 | | |
| 10 | } MEM; | |

TABLE 5

Cache Line Descriptor Data Structure 5000

| 1 | typedef struct__CLD__TYPE | |
| --- | --- | --- |
| 2 | { | |
| 3 | U32 | mirrorValid1; |
| 4 | SequenceType | mirrorSequence1; |
| 5 | BitMapType | mirrorMap1; |
| 6 | U32 | mirrorValid2; |
| 7 | SequenceType | mirrorSequence2; |
| 8 | BitMapType | mirrorMap2; |
| 9 | struct__MirrorEntryType | *mirrorEntry; |
| 10 | struct__MirrorOpType | *mirrorOp; |
| 11 | U32 | activeHostWrites; |
| 12 | SYS__BLOCK | l__blk; |
| 13 | BitMapType | validBlocks; |
| 14 | BitMapType | dirtyBlocks; |
| 15 | BitMapType | changeMap; |
| 16 | } CLD__TYPE; | |

TABLE 6

Mirror Entry Data Structure 6000

| 1 | typedef struct__MirrorEntryType | |
| --- | --- | --- |
| 2 | { | |
| 3 | U32 | mirrorIndex; |
| 4 | CLD__TYPE | *mirrorCld; |
| 5 | CLD__TYPE | *readWriteCld; |
| 6 | Boolean | firstMirror; |
| 7 | U16 | onFreeList; |
| 8 | U16 | usingAlternate; |
| 9 | struct__MirrorEntryType | *nextFree; |
| 10 | struct__MirrorEntryType | *prevFree; |
| 11 | struct__MirrorEntryType | *alternate; |
| 12 | } MirrorEntryType; | |

TABLE 7

Mirror Header Data Structure 7000

| 1 | typedef struct__MirrorHeaderType |
| --- | --- |
| 2 | { |
| 3 | U32 cld__count; |
| 4 | U8 *cld__addr; |
| 5 | U32 data__count; |

TABLE 7-continued

Mirror Header Data Structure 7000

| 6 | U8 *data_addr; |
| 7 | U32 valid_flag_count; |
| 8 | U8 *valid_flag_addr; |
| 9 | } MirrorHeaderType; |

TABLE 8

Mirror Queued Data Structure 8000

| 1 | typedef struct_MirrorQueuedType | |
| 2 | { | |
| 3 | U32 | mref; |
| 4 | IOP_Q_TABLE | *iqtptr; |
| 5 | struct_MirrorQueuedType | *next; |
| 6 | struct_MirrorQueuedType | *last; |
| 7 | } MirrorQueuedType; | |

TABLE 9

Mirror Operations Data Structure 9000

| 1 | typedef struct_MirrorOpType | |
| 2 | { | |
| 3 | Boolean | used; |
| 4 | volatile U32 | reply; |
| 5 | U32 | retry_count; |
| 6 | U32 | channel; |
| 7 | CLD_TYPE | *clp; |
| 8 | U32 | valid_flag; |
| 9 | DRVCMD | *dp; |
| 10 | MirrorHeaderType | mssg; |
| 11 | Boolean | mirrorInProgress; |
| 12 | Boolean | sending; |
| 13 | U32 | mirrorMapIndex; |
| 14 | BitMapType | mirrorMap; |
| 15 | U32 | waiting; |
| 16 | MirrorQueuedType | *tracksWaiting; |
| 17 | U32 | coalesced; |
| 18 | MirrorQueuedType | *tracksCoalesced; |
| 19 | } MirrorOpType; | |

What is claimed is:

1. A method of providing cache data mirroring for a first controller and an alternate controller, the first controller and the alternate controller being operatively coupled to a host computer and to disk storage devices, the first controller including and being operatively coupled to a first semiconductor memory, and the alternate controller including and being operatively coupled to a second semiconductor memory, the method comprising:

receiving, by the first controller, a write data request from the host computer, the write data request including a first data to be written to a disk storage device;

caching, by the first controller, the first data into the first semiconductor memory;

mirroring, by the first controller, the first data to the alternate controller such that the alternate controller copies the first data into the second semiconductor memory;

maintaining a first and second mirror sets for representing cache data stored by the first controller or the alternate controller, each of said mirror sets comprising a mirror valid flag, a mirror sequence, and a mirror map; and detecting, by the alternate controller, a failure of the first controller; and in response to the step of detecting, writing, by the alternate controller, the first data coupled with the mirrored data in the second semiconductor memory to a disk storage device.

2. The method of claim 1, wherein the mirroring further comprises;

posting, by the first controller, a mirror data request to the alternate controller, the request including the first data and an address identifying where in the second semiconductor memory the alternate controller shall store the first data;

receiving, by the alternate controller, the mirror data request; and in response to the step of receiving, storing, by the alternate controller, the first data into the address.

3. The method of claim 1 wherein said first controller and said alternate controller operate in dual active configuration.

4. The method of claim 1, wherein, in the mirroring, the fist data in the first semiconductor memory is explicitly linked to the first data in the second semiconductor memory.

5. The method of claim 1, wherein, the mirroring further comprises coalescing multiple cache data mirror operations to a particular cache line, into a single cache data mirror operation.

6. The method of claim 1, wherein, in the mirroring, in response to a secondary cache data mirror operation with respect to a particular cache line, only those data that have changed in the particular cache line are mirrored to the alternate controller.

7. The method of claim 1, further comprising sending, by the first controller, after the step of minoring, a status corresponding to the write data request to the host computer.

8. The method of claim 1, wherein the caching is only performed if the system drive has a policy of write-back.

9. A computer program product for use in conjunction with a first controller and an alternate controller, the first controller being operatively coupled to a first cache memory, and the alternate controller being operatively coupled to a second cache memory, the computer program product comprising a computer readable storage medium and a computer program stored thereon, the computer program comprising program instructions for:

receiving, by the first controller, a write data request from the host computer, the write data request including a first data to be written to a disk storage device;

caching, by the first controller, the first data into the first memory;

mirroring, by the first controller, the first data to the alternate controller, such that the alternate controller copies the first data into the second memory;

maintaining a first and second mirror sets for representing cache data stored by the first controller or the alternate controller, each of said mirror sets comprising a mirror valid flag, a mirror sequence, and a mirror map; and detecting, by the alternate controller, a failure of the first controller; and in response to the instructions for detecting, writing, by the alternate controller, the first data coupled with the mirrored data in the second memory to a disk storage device.

10. The computer program product of claim 9, wherein the instruction for mirroring further comprises instructions for:

posting, by the first controller, a mirror data request to the alternate controller, the request including the first data and an address identifying where in the second memory the alternate controller shall store the first data;

receiving, by the alternate controller, the mirror data request; and in response to the instructions for receiving, storing, by the alternate controller, the first data into the address.

11. The computer program product of claim 9 wherein the first controller and the alternate controller operate in dual active configuration.

12. The computer program product of claim 9, wherein, the instructions for mirroring, the first data in the first memory is explicitly linked to the first data in the second memory.

13. The computer program product of claim 9, wherein, the instructions for mirroring farther comprises at least one instruction for coalescing multiple cache data mirror operations to a particular cache line, into a single cache data mirror operation.

14. The computer program product of claim 9, wherein the instructions for mirroring in response to a secondary cache data mirror operation with respect to a particular cache line, mirroring only those first data that have changed in the particular cache line are mirrored to the alternate controller.

15. The computer program product of claim 9, further comprising an instruction for sending, by the first controller, after the instruction for mirroring, a status corresponding to the write data request to the host computer.

16. The computer program product of claim 9, wherein the instruction for caching is only performed if the system drive has a policy of write-back.

17. A method for tracking data mirrored by a first storage controller to a second storage controller, said method comprising:

receiving by said first storage controller a write request, said write request including a first data to be written;

caching by said first storage controller said first data into one or more cache lines operatively coupled to said first storage controller;

mirroring by said first storage controller said first data to one or more cache lines operatively coupled to said second storage controller before writing said data to be written to a disk storage device; and maintaining information in a memory location operatively coupled to said first storage controller, said information tracking the first data mirrored by said first storage controller to said one or more cache lines operatively coupled to said second storage controller, said information comprising a mirror valid flag, a mirror sequence, and a mirror map.

18. A method as set forth in claim 17 wherein said information keeps track of which of said cache lines operatively coupled to said first storage controller correspond to which of said cache lines operatively coupled to said second storage controller.

19. A method as set forth in claim 17 wherein said information racks which data blocks in a cache line in said first and second memory locations have changed since a previous cache of the first data into said cache line.

20. A method as set forth in claim 17 wherein one of said storage controllers maintains said information.

21. A method as set forth in claim 17 wherein said information includes task information used by said first storage controller to maintain and track tasks being performed or scheduled to be performed by said second storage controller.

22. A method as set forth in claim 17 wherein information includes a byte count of the mirrored data.

23. A method as set forth in claim 17 wherein said information organizes execution of data mirroring from said first storage controller to said second storage controller.

24. A method for tracking data mirrored by a first storage controller to a second storage controller, said method comprising the steps of:

receiving by said first storage controller a write request, said write request including data to be written;

caching by said first storage controller said data into one or more cache lines operatively coupled to said first storage controller;

mirroring by said first storage controller said data to one or more cache lines operatively coupled to said second storage controller; and maintaining information in a memory location operatively coupled to said first storage controller, said information tracking data mirrored by said first storage controller to said one or more cache lines operatively coupled to said second storage controller, wherein said information identifies multiple instances of data mirroring corresponding to a particular cache line.

25. A controller comprising:

a memory;

means for maintaining a data structure stored in the memory, said data structure comprising:

first and second mirror sets for representing cache data stored by a controller or an alternate controller, each of said mirror sets comprising a mirror valid flag for tracking whether the respective mirror set is valid, a mirror sequence for storing a sequence indicating a time-order in which cache data is mirrored to an alternate controller, and a mirror map for representing which cache data blocks were mirrored.

26. A controller as set forth in claim 25 wherein the second mirror set facilitates the partner controller having at least one valid mirror set with the exception of the first mirror operation on the partner controller.

27. A controller as set forth in claim 25 wherein said data structure further comprises a map of active host writes for determining if data is being moved from the host into a cache.

28. A controller as set forth in claim 27 wherein said data structure further comprises:

a map of valid blocks for representing each of a set of data blocks that are valid in a data cache;

a map of blocks for representing blocks of data that are in the data cache but not yet written to storage; and a change map for representing those memory blocks in cache memory that are being altered.

29. A controller as set forth in claim 25 wherein the mirror valid flag identifies whether an entire mirror set data structure and the cached data have been transferred to a partner controller without error.

30. A controller as set forth in claim 25 wherein the data structure further comprises:

another data structure for use by one of said storage controllers to (a) manage writing data to an alternate controller on a disk channel; (b) keep track of multiple write data requests from a host computer that have been coalesced into one cache mirror operation; and (c) manage queues of multiple I/O processes managing respective write data requests, while waiting for a cache mirror operation to complete.

31. A method for tracking data mirroring, said method comprising the steps of:

maintaining a data structure stored defined in a memory;

the data structure comprising first and second mirror sets for representing cache data stored by a controller or an alternate controller, each of said mirror sets comprising a mirror valid flag for tracking whether the mirror set is valid, a mirror sequence for storing a sequence indicating a time-order in which cache data is mirrored to an alternate controller, and a mirror map for representing which cache data blocks were mirrored.

32. A method for operating first and second storage controllers, said method comprising:

receiving, by the first storage controller, a write data request from a computer, the write data request including a first data to be written to a disk storage;

caching, by said first storage controller, the first data into a first semiconductor cache memory within said first storage controller;

mirroring, by said first storage controller, the first data to a second cache memory within said second storage controller;

maintaining a first and second mirror sets for representing cache data stored by the first controller or the alternate controller, each of said mirror sets comprising a mirror valid flag, a mirror sequence, and a mirror map; and detecting, by said second storage controller, a failure of said first storage controller, and in response, second storage controller writing the first data to be written to the disk storage coupled with the mirrored first data from said second cache memory to a disk storage.

33. A method as set forth in claim 32 further comprising the step of operating said first and second storage controllers in a dual active configuration.

34. A method for operating first and second storage controllers, said method comprising:

receiving, by the first storage controller, a plurality of separate write data requests from a computer, each of the write data requests including first data to be written to a disk storage;

caching, by said first storage controller, the first data of said plurality of write data requests into a first semiconductor cache memory within said first storage controller;

mirroring, by said first storage controller, the data of said plurality of write data requests to a second cache memory within said second storage controller;

maintaining a plurality of mirror sets for representing cache data, each of said mirror sets comprising a mirror valid flag, a mirror sequence, and a mirror map; and wherein said mirroring of said data of said plurality of write data requests occurs as a single mirror operation to reduce overhead associated with said mirroring step.

* * * * *